(12) United States Patent
Tuteja et al.

(10) Patent No.: US 11,965,112 B2
(45) Date of Patent: Apr. 23, 2024

(54) ANTI-ICING SURFACES EXHIBITING LOW INTERFACIAL TOUGHNESS WITH ICE

(71) Applicant: THE REGENTS OF THE UNIVERSITY OF MICHIGAN, Ann Arbor, MI (US)

(72) Inventors: Anish Tuteja, Ann Arbor, MI (US); Michael Thouless, Ann Arbor, MI (US); Kevin Golovin, Kelowna (CA); Abhishek Dhyani, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 890 days.

(21) Appl. No.: 16/977,797

(22) PCT Filed: Mar. 4, 2019

(86) PCT No.: PCT/US2019/020600
§ 371 (c)(1),
(2) Date: Sep. 2, 2020

(87) PCT Pub. No.: WO2019/190706
PCT Pub. Date: Oct. 3, 2019

(65) Prior Publication Data
US 2021/0009883 A1  Jan. 14, 2021

Related U.S. Application Data

(60) Provisional application No. 62/638,506, filed on Mar. 5, 2018.

(51) Int. Cl.
*C09D 5/00* (2006.01)
*C08K 5/00* (2006.01)

(52) U.S. Cl.
CPC .............. *C09D 5/00* (2013.01); *C08K 5/0016* (2013.01)

(58) Field of Classification Search
CPC ................................ C09D 5/00; C08K 5/0016
See application file for complete search history.

(56) References Cited

U.S. PATENT DOCUMENTS

| | | |
|---|---|---|
| 5,703,194 A | 12/1997 | Malik et al. |
| 6,153,304 A | 11/2000 | Smith et al. |

(Continued)

FOREIGN PATENT DOCUMENTS

| | | |
|---|---|---|
| CN | 101063022 A | 10/2007 |
| CN | 101835686 A | 9/2010 |

(Continued)

OTHER PUBLICATIONS

ASTM D412-06a, Standard Test Methods for Vulcanized Rubber and Thermoplastic Elastomers-Tension (ASTM International, West Conshocken, PA, 2013).

(Continued)

*Primary Examiner* — Anthony J Green
(74) *Attorney, Agent, or Firm* — Harness, Dickey & Pierce, P.L.C.

(57) ABSTRACT

An anti-icing coating is provided having low interfacial toughness (LIT) with ice. The anti-icing coating includes a polymer and a plasticizing agent. A thickness of the anti-icing coating may be less than or equal to about 100 micrometers (μm). Further, the anti-icing coating has an interfacial toughness ($\Gamma_{ice}$) with ice of less than or equal to about 1 J/m². Such an anti-icing coating may be applied to a substrate or surface of a device on which ice may form, such as aircraft, vehicles, marine vessels, outdoor equipment, snow or ice removal equipment, recreational equipment, wind turbines, telecommunications equipment, power (Continued)

Figure 1A:
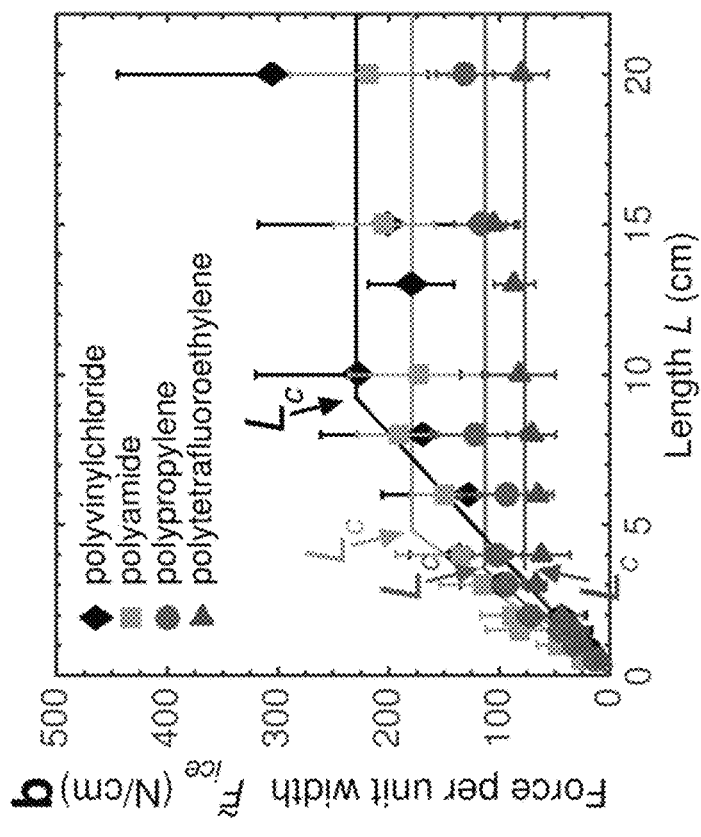

lines, and the like. Methods of forming such anti-icing coatings are also provided.

23 Claims, 16 Drawing Sheets

(56) References Cited

U.S. PATENT DOCUMENTS

| | | | |
|---|---|---|---|
| 6,702,953 | B2 | 3/2004 | Simendinger, III et al. |
| 6,797,795 | B2 | 9/2004 | Byrd |
| 7,247,349 | B2 | 7/2007 | Ozin et al. |
| 7,520,933 | B2 | 4/2009 | Park et al. |
| 7,704,320 | B2 | 4/2010 | Marr et al. |
| 8,206,469 | B2 | 6/2012 | Chiang et al. |
| 8,371,131 | B2 | 2/2013 | Zwieg |
| 8,793,970 | B2 | 8/2014 | Le Docte |
| 9,339,996 | B2 | 5/2016 | Hitschmann et al. |
| 9,670,304 | B2 | 6/2017 | Wang et al. |
| 9,879,153 | B2 | 1/2018 | Wang et al. |
| 9,963,597 | B2 | 5/2018 | Aizenberg et al. |
| 10,465,091 | B2 | 11/2019 | Tuteja et al. |
| 2002/0045030 | A1 | 4/2002 | Ozin et al. |
| 2003/0232941 | A1 | 12/2003 | Byrd |
| 2006/0257663 | A1 | 11/2006 | Doll et al. |
| 2006/0281861 | A1 | 12/2006 | Putnam |
| 2007/0134420 | A1 | 6/2007 | Koberstein et al. |
| 2007/0254170 | A1 | 11/2007 | Hoover et al. |
| 2008/0175987 | A1 | 7/2008 | Carter |
| 2011/0123803 | A1 | 5/2011 | Yamanaka et al. |
| 2012/0135237 | A1 | 5/2012 | Gracias et al. |
| 2013/0101791 | A1 | 4/2013 | Hitschmann et al. |
| 2014/0010965 | A1 | 1/2014 | Li et al. |
| 2014/0088219 | A1 | 3/2014 | Chen et al. |
| 2014/0113144 | A1 | 4/2014 | Loth et al. |
| 2014/0127516 | A1 | 5/2014 | Wang et al. |
| 2014/0234579 | A1 | 8/2014 | Wang et al. |
| 2014/0290732 | A1 | 10/2014 | Aizenberg et al. |
| 2014/0328999 | A1 | 11/2014 | Aizenberg et al. |
| 2014/0342954 | A1 | 11/2014 | Ingber et al. |
| 2015/0152270 | A1 | 6/2015 | Aizenberg et al. |
| 2016/0009971 | A1 | 1/2016 | Wang et al. |

FOREIGN PATENT DOCUMENTS

| | | |
|---|---|---|
| CN | 102558410 A | 7/2012 |
| CN | 103756550 A | 4/2014 |
| EP | 0155222 A2 | 9/1985 |
| WO | 8808018 A1 | 10/1988 |
| WO | 9740385 A1 | 10/1997 |
| WO | 0021905 A1 | 4/2000 |
| WO | 02091028 A2 | 11/2002 |
| WO | 2005047575 A1 | 5/2005 |
| WO | 2005062091 A2 | 7/2005 |
| WO | 2005066672 A1 | 7/2005 |
| WO | 2005084369 A2 | 9/2005 |
| WO | 2005089129 A2 | 9/2005 |
| WO | 2012003004 A2 | 1/2012 |
| WO | 2012170832 A1 | 12/2012 |
| WO | 2014012080 A1 | 1/2014 |
| WO | 2014088598 A1 | 6/2014 |
| WO | 2014116221 A1 | 7/2014 |
| WO | 2016176350 A1 | 11/2016 |

OTHER PUBLICATIONS

Bharathidasan, T. et al., "Effect of wettability and surface roughness on ice-adhesion strength of hydrophilic, hydrophobic and super hydrophobic surfaces," Applied Surface Science, 314, pp. 241-250 (Published online: Jun. 21, 2014); DOI: 10.1016/j.apsusc.2014.06. 101.

Buschow, K.H. Jürgen Cahn, et al . . . (2001). Encyclopedia of Materials—Science and Technology, vol. 3. (pp. 2474, 2482-2484). Elsevier.Retrieved from app.knovel.com/hotlink/toc/id:kpEMSTV001/encyclopedia-materials/encyclopedia-materials (Year: 2001).

Davis, Alexander et al., "Superhydrophobic Nanocomposite Surface Topography and Ice Adhesion," ACS Applied Materials Interfaces, 6 (12), pp. 9272-9279 (Published May 29, 2014).

Dou, Renmei et al., "Anti-icing Coating with an Aqueous Lubricating Layer," ACS Appl. Mater. Interfaces, 6, pp. 6998-7003 (Published May 14, 2014); DOI: 10.1021/am501252u.

Extended European Search Report issued in EP Application No. 16787084.9 dated Sep. 19, 2018, 8 pages.

Farhadi, S. et al., "Anti-icing performance of superhydrophobic surfaces," Applied Surface Science, 257, pp. 6264-6269 (Published online Feb. 12, 2011) ; DOI: 10.1016/j.apsusc.2011.02.057.

First Examination Report for Australian Patent Application No. 2016254019 dated Sep. 26, 2019, 5 pages.

First Examination Report for Indian Patent Application No. 201717042070 dated Dec. 26, 2019, 6 pages.

First Office Action for Chinese Patent Application No. 201680037371.4 dated Jan. 3, 2020 with English language translation provided by Unitalen Attorneys at Law, 20 pages.

Galliano, A. et al., "Adhesion and friction of PDMS networks: molecular weight effects," Journal of Colloid and Interface Science, (2003) 265, pp. 372-379 DOI: 10.1016/S0021-9797(03)00458-2.

Guo, Peng et al., "Icephobic/Anti-Icing Properties of Micro/Nanostructured Surfaces," Adv. Mater., 24, pp. 2642-2648 (Published online:Apr. 10, 2012); DOI: 10.1002/adma.201104412.

He, Yang et al., "Reducing ice adhesion by hierarchical micro-nano-pillars," Applied Surface Science 305 (2014), pp. 589-595 (Published online Mar. 29, 2014); DOI: 10.1016/j.apsusc.2014.03.139.

International Search Report and Written Opinion of the International Searching Authority issued in PCT/US2016/029596, dated Aug. 22, 2016; ISA/KR.

International Search Report and Written Opinion of the International Searching Authority issued in PCT/US2019/020600, dated Sep. 16, 2019 (ISA/US), 9 pages.

K. Golovin, A. Tuteja, A predictive framework for the design and frabication of icephobic polymers. Sci. Adv. 3, e1701617 (2017). (Year: 2017).

K. Golovin, S.P.R. Kobaku, D.H. Lee, E.T. DiLoreto, J.M. Mabry, A. Tuteja, Designing durable icephobic surfaces. Sci. Adv. 2, e1501496 (2016). (Year: 2016).

Kim, Philseok et al., "Hierarchical or Not? effect of the Length Scale and Hierarchy of the Surface Roughness on Omniphobicity of Lubricant-Infused Substrates," Nano Lett. 2013, 13 (4), pp. 1793-1799 (Published online Mar. 6, 2013); DOI: 10.1021/nl4003969 (Abstract only).

Kim, Philseok et al., "Liquid-Infused Nanostructured Surfaces with Extreme Anti-Ice and Anti-Frost Performance," ACS NANO, 6 (8), pp. 6569-6577 (Published online Jun. 10, 2012); DOI: 10.1021/nn302310q.

Lv, Jianyong et al., "Bio-inspired Strategies for Anti-Icing," ACS Nano, 8 (4) pp. 3152-3169 (Published online Mar. 4, 2014); DOI: 10.1021/nn406522n . . . .

López, Susana Hernández et al., "Acrylated-Epoxidized Soybean Oil-Based Polymers and Their Use in the Generation of Electrically Conductive Polymer Composites," Soybean, Hany A. El-Shemy, IntechOpen (Feb. 20, 2013) DOI: 10.5772/52992.

Meuler, Adam J. et al. "Relationships Between Water Wettability and Ice Adhesion," ACS Applied Materials & Interfaces, 2 (11), pp. 3100-3110 (Published online Oct. 15, 2010); DOI: 10.1021/am1006035.

Palchesko, Rachelle N. et al., "Development of Polydimethylsiloxane Substrates with tunable Elastic Modulus to Study Cell Mechanobiology in Muscle and Nerve," PLoS ONE,7 (12), e51499; DOI: 10.1071/journal.pone.0051499.

Tarquini, Stefania et al., "Investigation of ice shedding properties of superhydrophobic coatings on helicopter blades," Cold Regions Science and Technology, 100 (2014), pp. 50-58; DOI: 10.1016/j.coldregions/2013.12.009.

Urata, Chihiro et al., "Self-lubricating organogels (SLUGs) with exceptional syneresis-induced anti-sticking properties viscous emulsions and ices," J. Mater. Chem. A, 3, pp. 12626-12630 (Published May 27, 2015); DOI: 10.1039/c5ta02690c.

(56) References Cited

OTHER PUBLICATIONS

Volinsky, A. A. et al., "Interfacial toughness measurements for thin films on substrates," Acta Materialia 50 (2002), pp. 441-466.
Wang, Yaling et al., "Organogel as durable anti-icing coatings," Sci China Mater, 58, pp. 559-565 (Published online Jul. 10, 2015); DOI: 10.1007/s40843-015-0069-7.
Wang, Yuanyi et al., "Verification of Icephobic/Anti-icing Properties of a Superhydrophobic Surface," ACS Applied Materials & Interfaces 2015, 5 pp. 3370-3381 (Published Mar. 28, 2013); DOI: 10.1021/am400429q.
Wong, Tak-Sing et al., "Bioinspired self-repairing slippery surfaces with pressure-stable omniphobicity," Nature, 477, pp. 443-447 (Published Sep. 22, 2011); DOI: 10.1038/nature10447.
Xu, Qian et al., "Energy-Effective Frost-free Coatings Based on Superhydrophobic Aligned Nanocones," ACS Appl. Mater. Interfaces (2014), 6, pp. 8976-8980 (Published Jun. 10, 2014).
Zhu, Lin et al., "Ice-phobic Coatings Based on Silicon-Oil-Infused Polydimethylsiloxane," ACS Applied Materials Surfaces, 5 (10), pp. 4053-4062 (Published Apr. 22, 2013).

ANTI-ICING SURFACES EXHIBITING LOW INTERFACIAL TOUGHNESS WITH ICE

CROSS-REFERENCE TO RELATED APPLICATIONS

This application is a U.S. National Phase Application under 35 U.S.C. 371 of International Application No. PCT/US2019/020600 filed on Mar. 4, 2019. This application claims the benefit and priority of U.S. Provisional Application No. 62/638,506, filed on Mar. 5, 2018. The entire disclosures of the above applications are incorporated herein by reference.

FIELD

The present disclosure relates to anti-icing coatings exhibiting low interfacial toughness with ice to provide anti-icing properties for various engineered surfaces and methods for fabricating such coatings.

BACKGROUND

This section provides background information related to the present disclosure which is not necessarily prior art.

Various outdoor equipment, including power lines, wind turbines, telecommunication towers, airplane wings, marine vessels, vehicle windshields, commercial and residential refrigerators and freezers, and the like, can suffer from ice formation and accretion. The strong adhesion between ice and most engineered materials inhibits application efficiency in subzero conditions. Further, ice formation can inhibit functionality to the extent that safety is compromised. The strong adhesion between ice and most structural materials makes the removal of ice very costly, both energetically and economically. Mechanical, electro-mechanical, thermal and chemical methodologies are the current industrial standards for ice removal.

Common engineering materials like aluminum, steel, and glass, when clean, all exhibit an ice adhesion strength ($\tau_{ice}$) of greater than about 1,000 kPa. Surfaces exhibiting $\tau_{ice}$ of less than about 100 kPa are generally designated as icephobic. Such icephobic surfaces are promising candidates to reduce ice adhesion for many large-scale applications. However, efforts to minimize $\tau_{ice}$ suffer from a substantial shortcoming, namely scalability. Regardless of the $\tau_{ice}$ value, an increase in the iced area of a surface necessitates an increase in force required to remove the ice, which will eventually become prohibitively high. The shear force, F, required to de-bond an interfacial area, A, results in $\tau_{ice}$=F/A. An increase in A necessitates an increase in F, and eventually the force necessary to remove a large area of accreted ice will be prohibitively high.

Large engineering structures that suffer from heavy icing, such as wind-turbine blades, boat hulls, airplane wings, and power lines, typically scale from a few meters to hundreds of meters. Even with the best performing icephobic systems previously developed, the force necessary to remove ice accreted on these large areas, for example a wind turbine blade (surface area of approximately 200 m$^2$) or a boat hull (surface area of approximately 20,000 m$^2$) will be extremely high. The intractable issue of scalability limits the usage of icephobic materials and it is believed that no known icephobic material system exists where the force to remove the adhered ice will not scale with the interfacial area between the ice and underlying surface. It would thus be highly desirable to develop anti-icing surface coatings and materials that do not require high forces to remove ice from large surface areas.

SUMMARY

This section provides a general summary of the disclosure, and is not a comprehensive disclosure of its full scope or all of its features.

In various aspects, the present disclosure provides an anti-icing coating having low interfacial toughness with ice. The anti-icing coating may comprise a polymer and a plasticizing agent. A thickness of the anti-icing coating is less than or equal to about 100 micrometers (μm) and the anti-icing coating has an interfacial toughness ($\Gamma_{ice}$) with ice of less than or equal to about 1 J/m$^2$.

In one aspect, the anti-icing coating has an interfacial toughness ($\tau_{ice}$) with ice of less than or equal to about 0.25 J/m$^2$.

In one aspect, the anti-icing coating has a surface area of greater than or equal to about 3 cm$^2$.

In one aspect, the anti-icing coating has a surface area of greater than or equal to about 1 m$^2$.

In one aspect, anti-icing coating has a critical length ($L_c$) of greater than or equal to about 2.5 cm.

In one aspect, a shear force to remove ice from the anti-icing coating remains substantially constant when a length of the anti-icing coating is greater than a critical length ($L_c$) of the anti-icing coating.

In one aspect, the polymer is selected from the group consisting of: polyvinyl chloride (PVC), polydimethylsiloxane (PDMS), polyethylene (PE), ultra-high molecular weight polyethylene (UHMWPE), low density polyethylene (LDPE), polypropylene (PP), polycarbonate (PC), polystyrene (PS), polymethylmethacrylate (PMMA), glycol-modified polyethylene terephthalate (PETG), polyamide (nylon), acrylonitrile butadiene styrene (ABS), polyvinylchloride (PVC), chlorinated polyvinylchloride (CPVC), polytetrafluoroethylene (PTFE), a fiberglass-epoxy laminate, and combinations thereof.

In one aspect, the plasticizing agent is selected from the group consisting of: polydimethylsiloxane (PDMS) oil, polymethylphenylsiloxane (PMPS) oil, polymethylhydrosiloxane (PMHS), polyalkylene oils, perfluoroether oils, natural oils, coconut oil, soybean oil, vegetable oil, cod liver oil, safflower oil, eucalyptus oil, fish oils, rapeseed oil, fluorinated silicone oils, perfluorodecalin, fluorocarbon oils, perfluoropolyether oil (PFPE), castor oil, mineral oils, functionalized silicone oils, functionalized perfluoropolyethers, diisodecyl adipate (DIDA), medium-chain triglyceride (MCT), diundecyl phthalate (DUP), and combinations thereof.

In one aspect, the polymer is present at greater than or equal to about 10% to less than or equal to about 99% by mass of the anti-icing coating.

In one aspect, the plasticizing agent is present at greater than or equal to about 1% to less than or equal to about 60% by mass in the anti-icing coating.

In one aspect, the thickness of the anti-icing coating is greater than or equal to about 10 nanometers (nm) to less than or to about 100 micrometers (μm).

In other variations, the present disclosure provides a device comprising a surface and an anti-icing coating. The anti-icing coating comprises a polymer and a plasticizing agent disposed on the surface. A thickness of the anti-icing coating is less than or equal to about 100 micrometers (μm)

and the anti-icing coating has an interfacial toughness with ice of less than or equal to about 1 J/m².

In one aspect, the device is selected from the group consisting of: an aircraft, a vehicle, a marine vessel, outdoor equipment, snow or ice removal equipment, recreational equipment, a wind turbine, telecommunications equipment, power lines, and combinations thereof In one aspect, the anti-icing coating has an interfacial toughness ($\Gamma_{ice}$) with ice of less than or equal to about 0.5 J/m².

In one aspect, the anti-icing coating covers a surface area of greater than or equal to about 3 cm² on the surface of the device.

In one aspect, the anti-icing coating covers a surface area of greater than or equal to about 1 m² on the surface of the device.

In one aspect, the anti-icing coating has a critical length ($L_c$) of greater than or equal to about 2.5 cm and the anti-icing coating covers a length of the surface of greater than the critical length.

In one aspect, a shear force to remove ice from the anti-icing coating on the surface of the device remains substantially constant when a length of the anti-icing coating is greater than a critical length ($L_c$) of the anti-icing coating.

In one aspect, the polymer is selected from the group consisting of: polyvinyl chloride (PVC), polydimethylsiloxane (PDMS), polyethylene (PE), ultra-high molecular weight polyethylene (UHMWPE), low density polyethylene (LDPE), polypropylene (PP), polycarbonate (PC), polystyrene (PS), polymethylmethacrylate (PMMA), glycol-modified polyethylene terephthalate (PETG), polyamide (nylon), acrylonitrile butadiene styrene (ABS), polyvinylchloride (PVC), chlorinated polyvinylchloride (CPVC), polytetrafluoroethylene (PTFE), a fiberglass-epoxy laminate, and combinations thereof In one aspect, the plasticizing agent is selected from the group consisting of: polydimethylsiloxane (PDMS) oil, polymethylphenylsiloxane (PMPS) oil, polymethylhydrosiloxane (PMHS), polyalkylene oils, perfluoroether oils, natural oils, coconut oil, soybean oil, vegetable oil, cod liver oil, safflower oil, eucalyptus oil, fish oils, rapeseed oil, fluorinated silicone oils, perfluorodecalin, fluorocarbon oils, perfluoropolyether oil (PFPE), castor oil, mineral oils, functionalized silicone oils, functionalized perfluoropolyethers, diisodecyl adipate (DIDA), medium-chain triglyceride (MCT), diundecyl phthalate (DUP), and combinations thereof.

In one aspect, the polymer is present at greater than or equal to about 10% to less than or equal to about 99% by mass of the anti-icing coating and the plasticizing agent is present at greater than or equal to about 1% to less than or equal to about 60% by mass in the anti-icing coating.

In one aspect, the thickness of the anti-icing coating is greater than or equal to about 10 nanometers (nm) to less than or to about 100 micrometers (μm).

In yet other variations, the present disclosure provides a method of forming an anti-icing surface on a substrate. The method comprises applying an anti-icing coating to a surface of the substrate. The anti-icing coating comprises a polymer and a plasticizing agent. A thickness of the anti-icing coating may be less than or equal to about 100 micrometers (μm). The anti-icing coating disposed on the surface has an interfacial toughness with ice of less than or equal to about 1 J/m².

In one aspect, the substrate is part of a device selected from the group consisting of: an aircraft, a vehicle, a marine vessel, outdoor equipment, snow or ice removal equipment, recreational equipment, a wind turbine, telecommunications equipment, power lines, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1B:
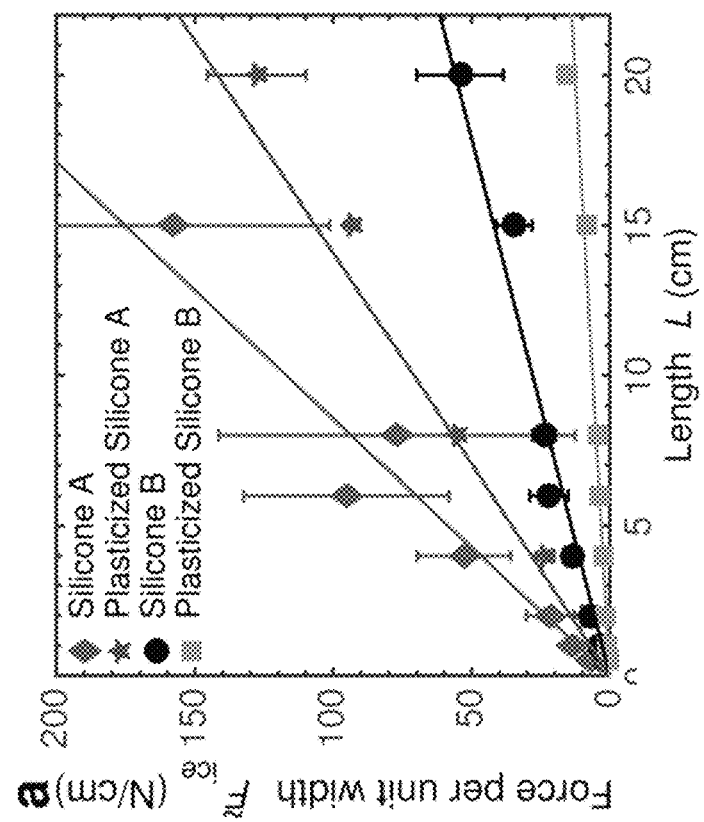
Figures 1C, 1D:
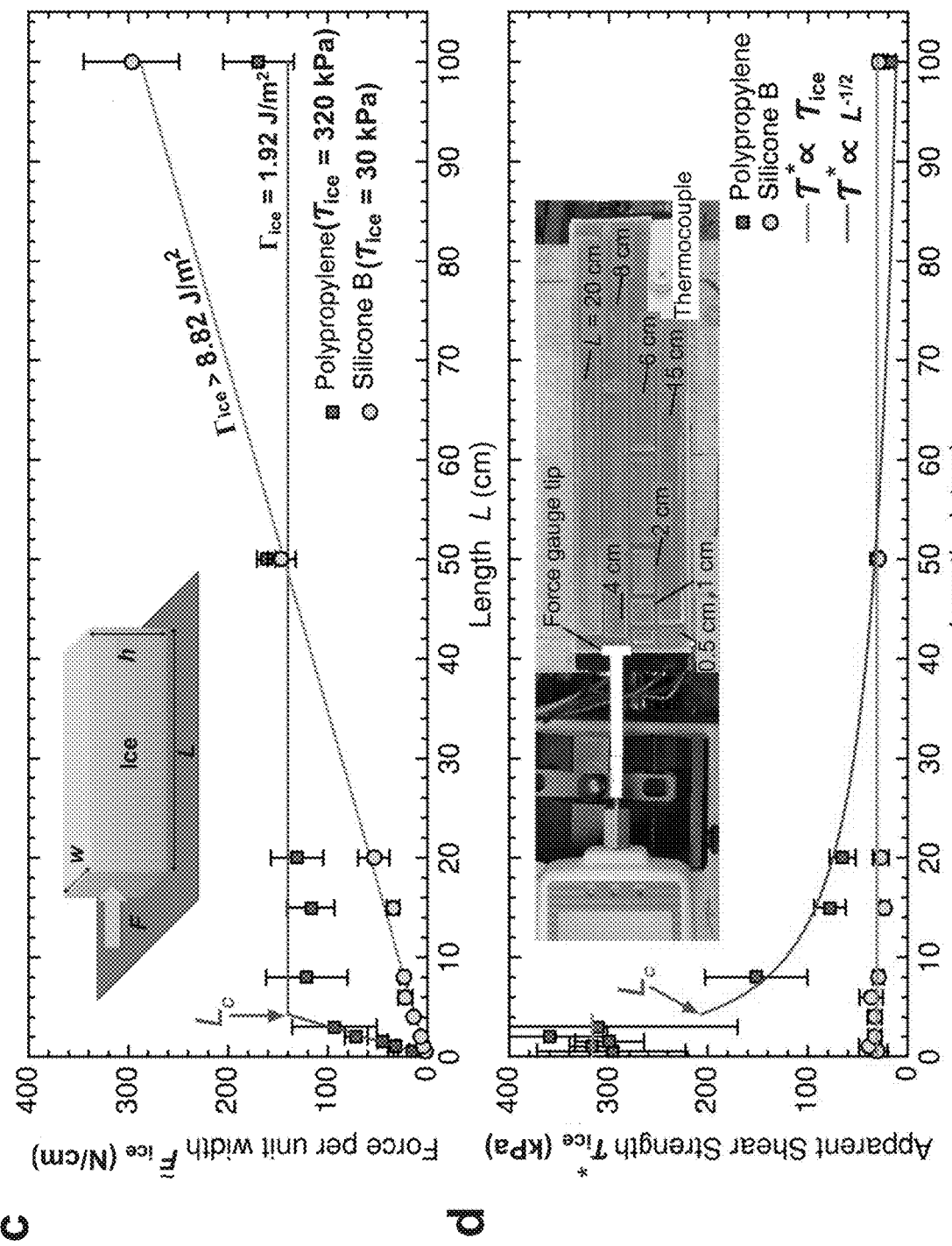

FIGS. 1A-1D. FIGS. 1A-1D show strength versus toughness for controlled facture. In FIG. 1A, a force per unit width required to de-bond ice from four silicone materials: neat SYLGARD 184™ (Silicone A), SYLGARD 184™ with 25 wt. % silicone oil, neat Mold Max STROKE™ (Silicone B), and Mold Max STROKE™ with 40 wt. % silicone oil. In all cases the fracture is controlled by adhesive strength for the range of interfacial lengths studied, and no toughness-controlled fracture is observed. FIG. 1B shows a force per unit width required to fracture ice from four representative polymers, namely polyvinyl chloride (PVC), polyamide (nylon or PA), polypropylene (PP), and polytetrafluoroethylene (PTFE). Up to a critical length ($L_c$), strength controls the fracture of ice from these systems. However, after $L_c$, no additional force is necessary to remove adhered ice. In FIG. 1C, a force per unit width required to fracture ice from either Silicone B or polypropylene (PP) as a function of interfacial length is shown. For PP, the force linearly increases with the length of ice until the critical length ($L_c$=3.6 cm), after which no additional force is required to remove the accreted ice. For Silicone B, strength always controls the fracture. The inset shows a schematic of the measurements taken. FIG. 1D shows data from FIG. 1C recast in terms of the apparent shear strength, $\tau^*_{ice}$, indicating that $\tau^*_{ice}=\tau_{ice}$ for Silicone B L≤100 cm, but $\tau^*_{ice}<\tau_{ice}$ for PP when L≥3.6 cm. The inset shows an experimental setup, with 11 pieces of ice of 8 different lengths, adhered to Silicone B.

Figures 2A, 2B:
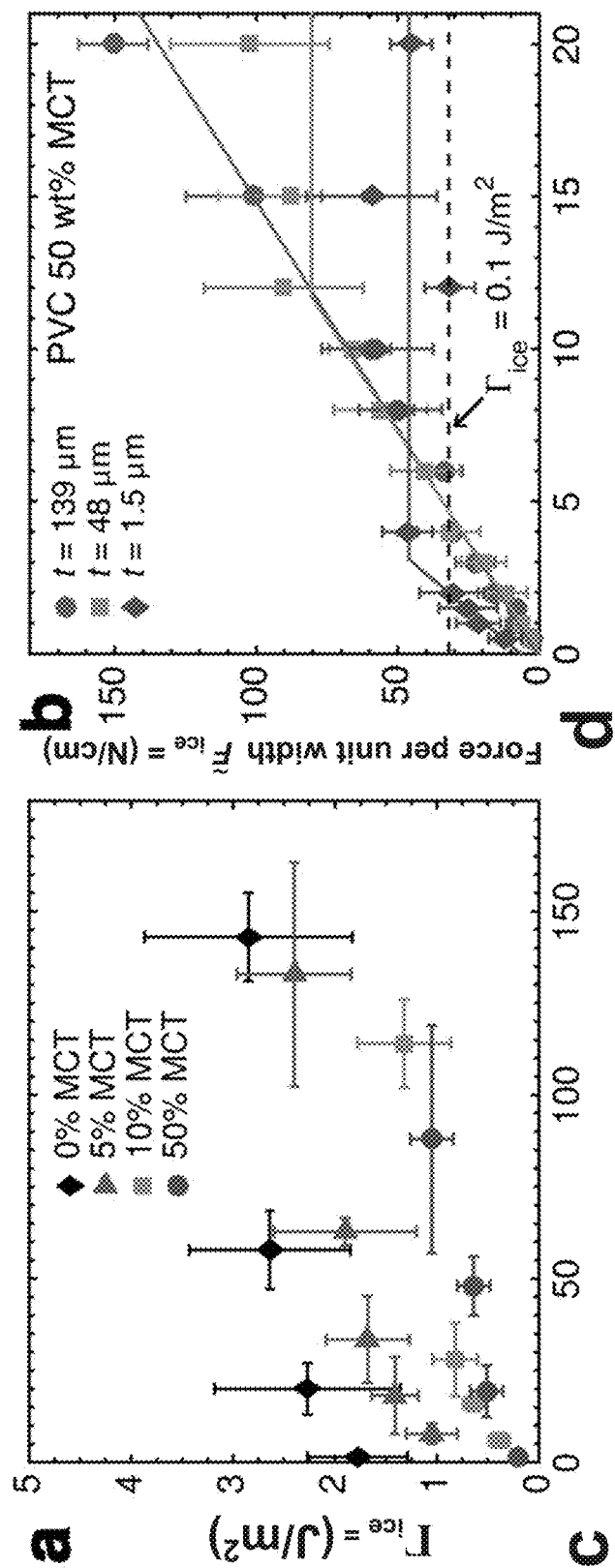
Figures 2C, 2D:
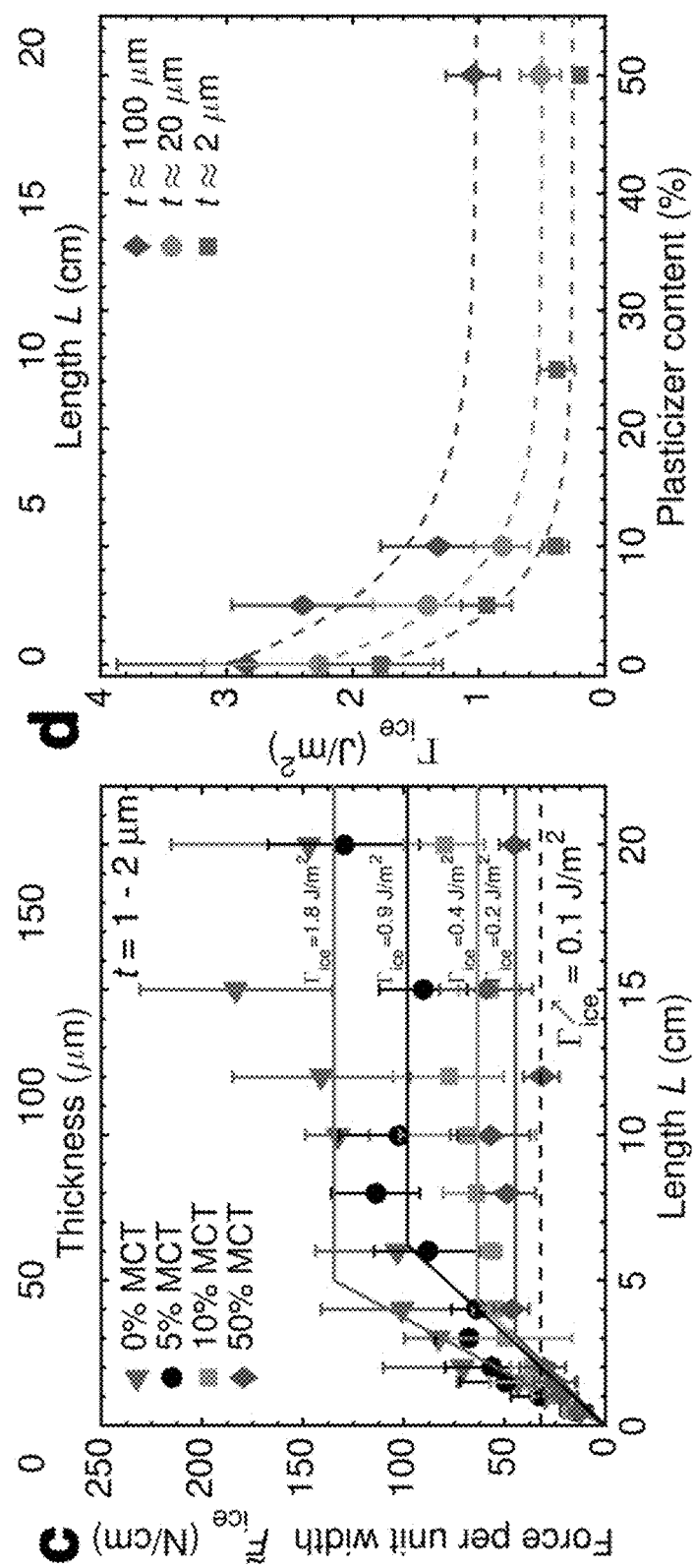

FIGS. 2A-2D. FIGS. 2A-2D show control of interfacial toughness of ice ($\Gamma_{ice}$). FIG. 2A shows the effect of thickness on the interfacial toughness between PVC plasticized with a medium chain triglyceride (MCT) oil and ice, for four different plasticizing agent contents. FIG. 2B shows a force per unit width required to fracture ice from three different thicknesses of PVC plasticized with 50 wt. % medium-chain triglyceride (MCT) oil. Note that, for the thickest sample, strength controlled the fracture up to a length (L)=20 cm. In FIG. 2C, a force per unit width is shown that is required to fracture ice from thin PVC coatings with four different plasticizing agent contents. A toughness-controlled regime of fracture is always observed. FIG. 2D shows the effect of plasticizing agent content on interfacial toughness $\Gamma_{ice}$ for three different thicknesses of plasticized PVC.

Figure 3A:
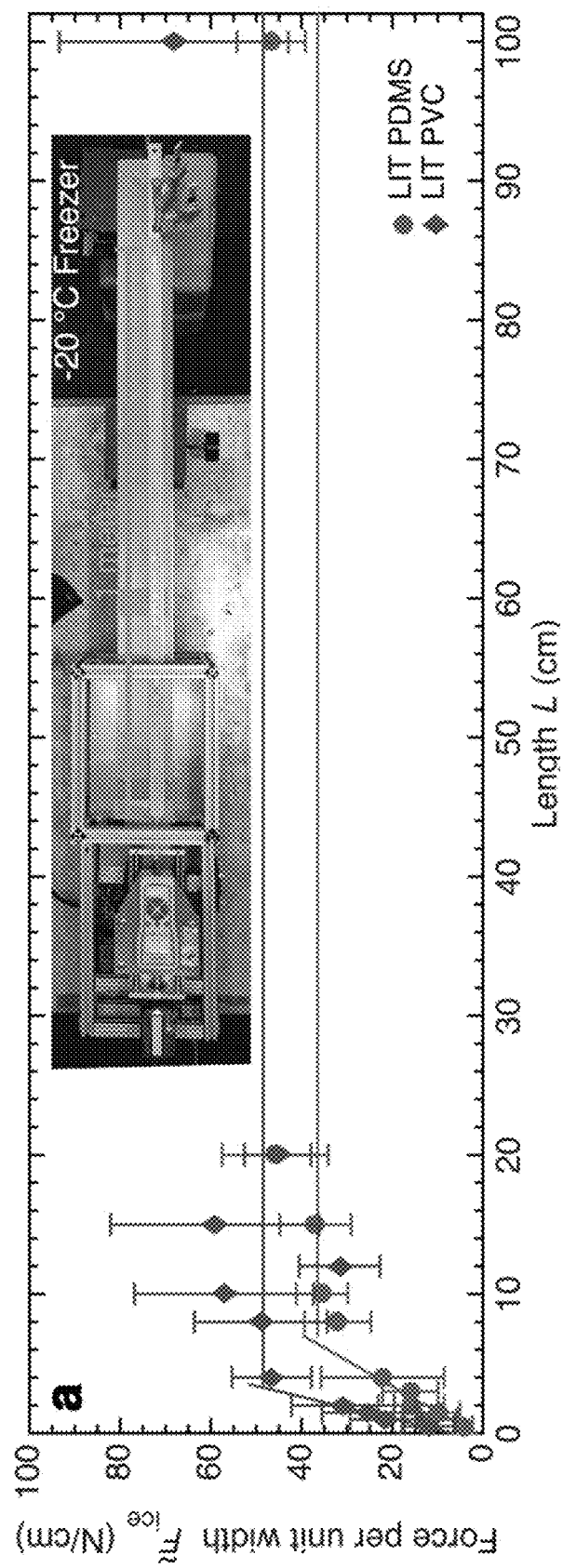
Figure 3B:
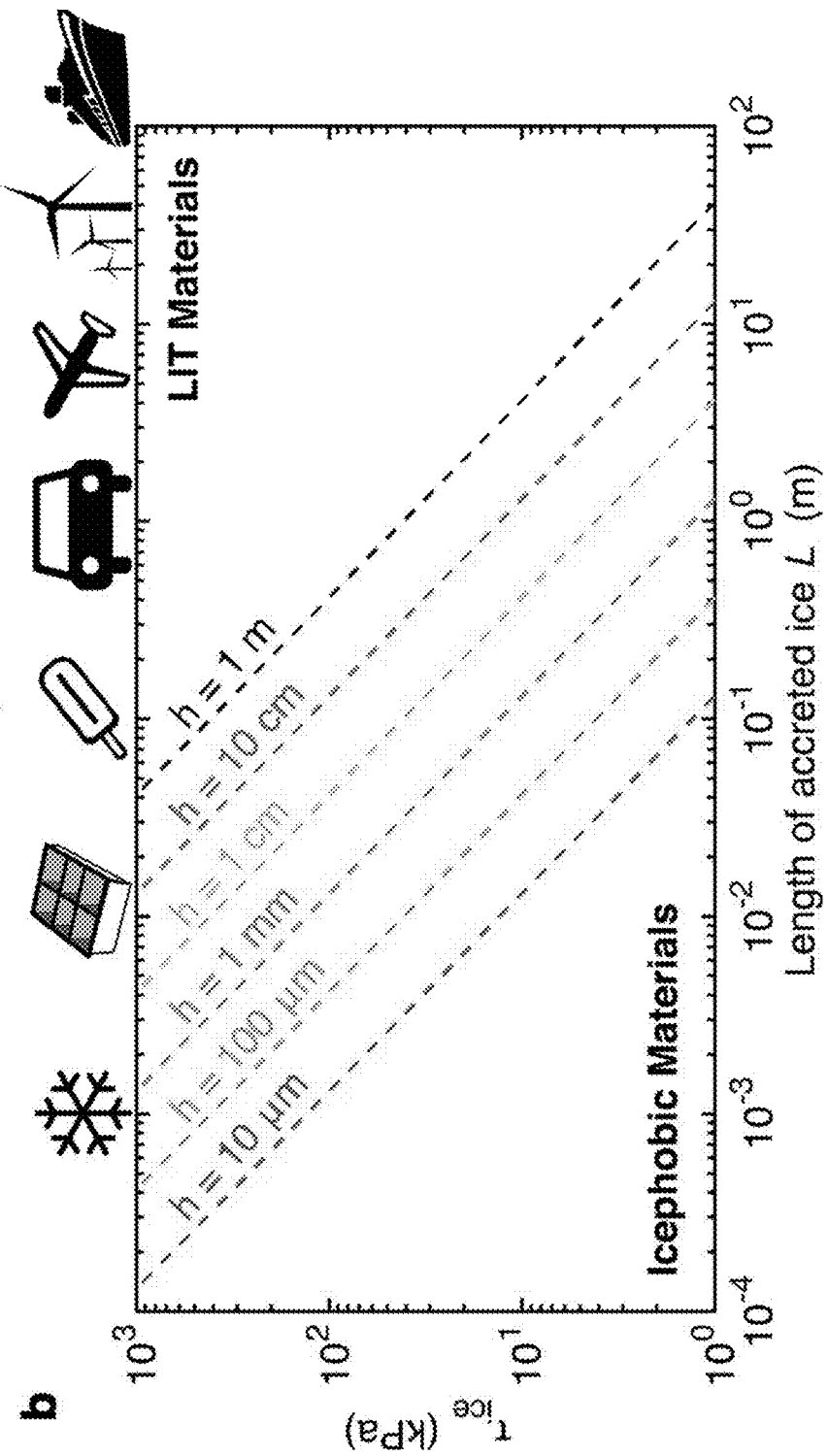

FIGS. 3A-3B. FIGS. 3A-3B show large scale materials having low interfacial toughness (LIT) with ice prepared in accordance with certain aspects of the present disclosure. In FIG. 3A, a force required to fracture ice from an LIT PDMS and LIT PVC system is shown.

Even over an interfacial length of 1 meter, the necessary force of fracture remains constant beyond the critical length ($L_c$). The inset shows an experimental setup, performed in a walk-in freezer held at −20° C. FIG. 3A shows that the length of accreted ice determines if an icephobic material or a LIT material may be used for a given application. Based on the allowable thickness of accreted ice, there exists a critical length beyond which a LIT material may be designed to always exhibit a lower apparent ice-adhesion strength. Note that decreasing the thickness of ice favors LIT materials, making them advantageous in situations where the ice needs to be removed before it grows to an appreciable size. The characteristic lengths of several relevant applications are also depicted in cartoon form. From left to right: a snowflake, an ice cube tray, a frozen confectionary (e.g., popsicle), an automobile, an airplane, a wind turbine blade, and a naval vessel.

Figure 4A:
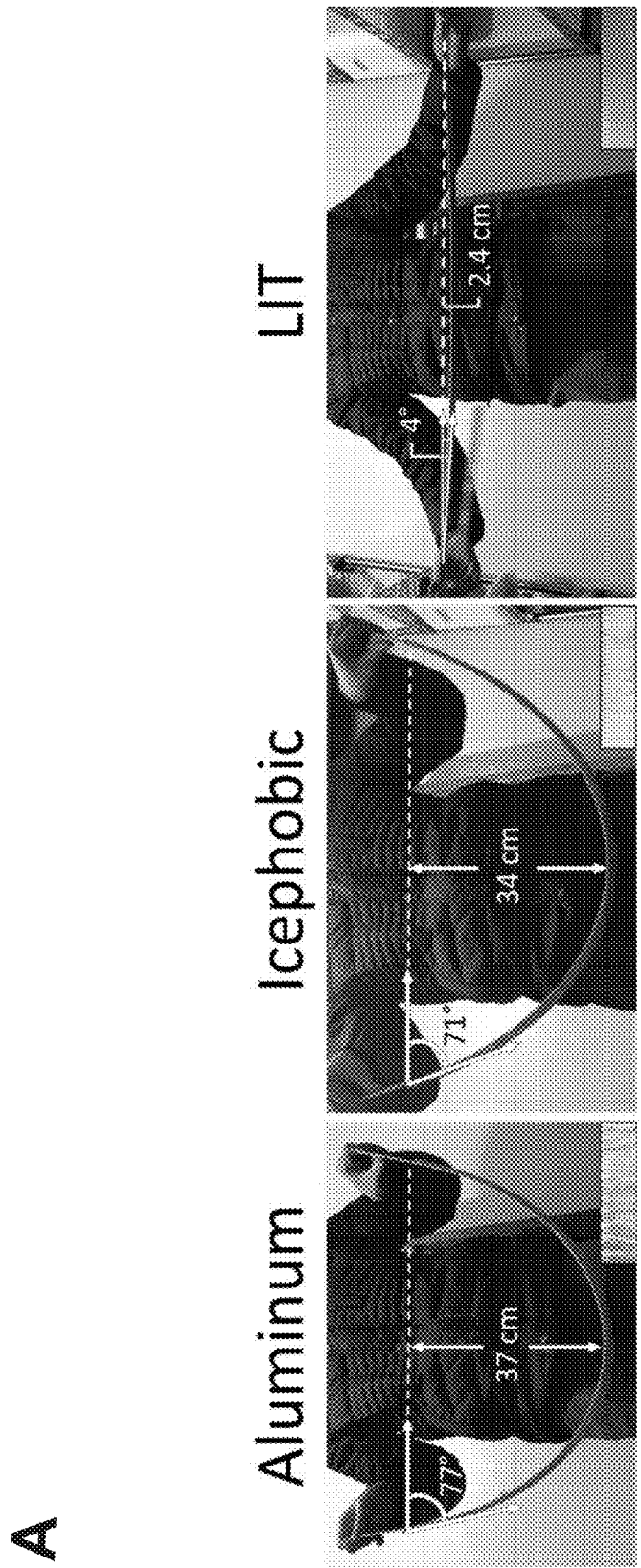
Figure 4B:

FIGS. 4A-4B. FIGS. 4A-4B show materials having low interfacial toughness (LIT) under normal loading conditions. FIG. 4A shows a comparison between uncoated, icephobic, and LIT aluminum beams adhered to a sheet of ice (dimensions of 1 m×2.54 cm×0.8 cm) undergoing off-center load flex tests. The load exerted on the beam is estimated from the measured deflections using beam theory. Ice fractured from the LIT coated specimen prepared in accordance with certain aspects of the present disclosure has a remarkably low apparent ice adhesion strength of 0.39 kPa, while the uncoated aluminum and icephobic specimens remained adhered to the ice sheet at severe deflections. FIG. 4B shows a comparison between uncoated, icephobic and LIT aluminum beams adhered to a sheet of ice (dimensions of 1 m×2.54 cm×0.8 cm) undergoing single load cantilever bending tests. The entire ice slab fractures cleanly from the LIT coated beam with an extremely low deflection of 4.6 cm, while the uncoated and icephobic beams remained adhered to the ice sheet at severe deflections. The ice sheet displayed cohesive fracture as shown in insets.

Figures 5A, 5B, 5C, 5D:
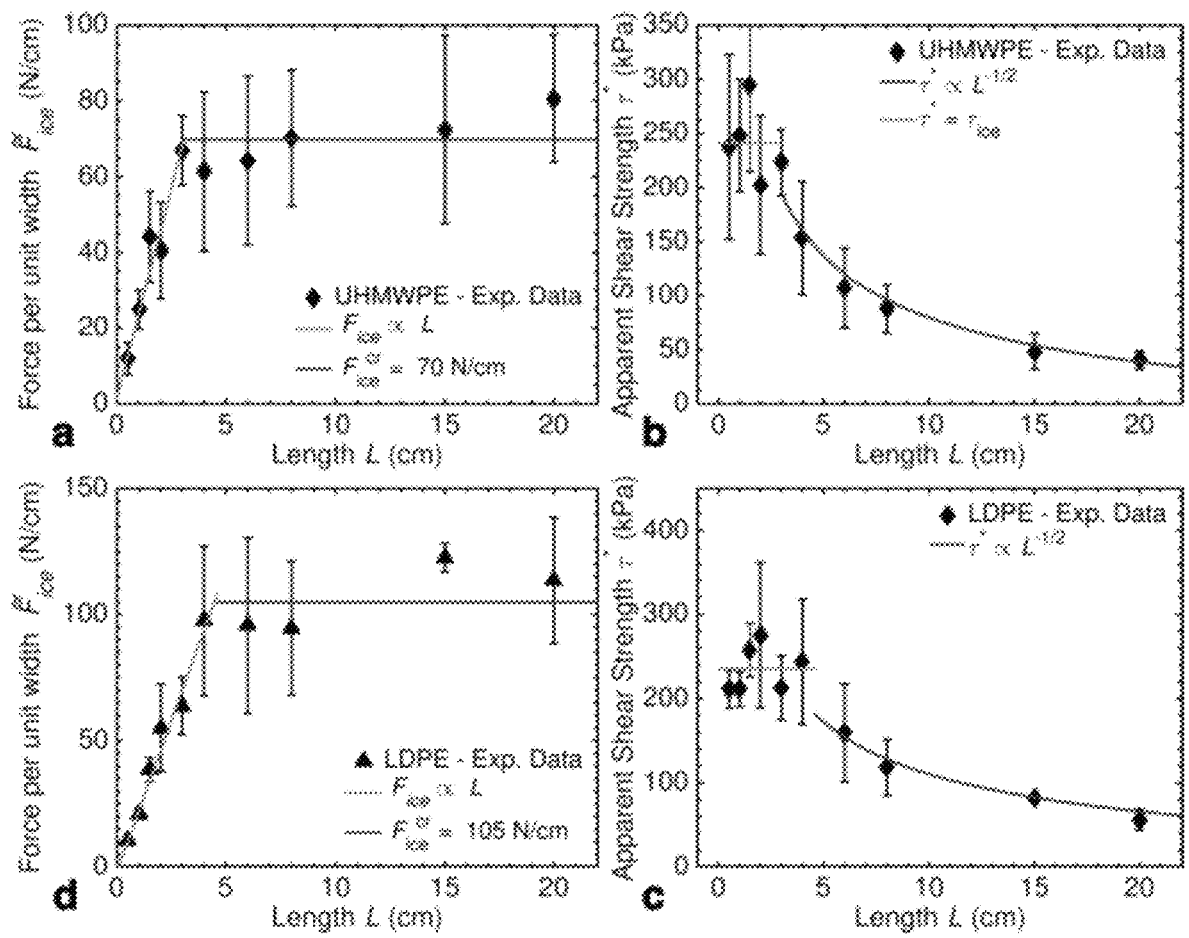

FIGS. 5A-5D. FIGS. 5A-5D show fracture of ice from ultrahigh molecular weight polyethylene (UHMWPE) and low density polyethylene (LDPE) materials prepared in accordance with certain aspects of the present disclosure. In FIG. 5A, a force per unit width required to detach ice from UHMWPE is shown. In FIG. 5B, an apparent ice adhesion strength of UHMWPE is shown. After $L_c$=3.8 cm, the force becomes constant and $\tau^*_{ice}$ begins to decrease. At L=20 cm, $\tau^*_{ice}$=49±4.9 kPa. In FIG. 5C, a shear force per unit width required to detach ice from LDPE is shown. In FIG. 5D, an apparent ice adhesion strength of LDPE is shown. After $L_c$=4.6 cm, the force becomes constant and $\tau^*_{ice}$ begins to decrease. At L=20 cm, $\tau^*_{ice}$=52±5.9 kPa.

Figures 6A, 6B, 6C, 6D:
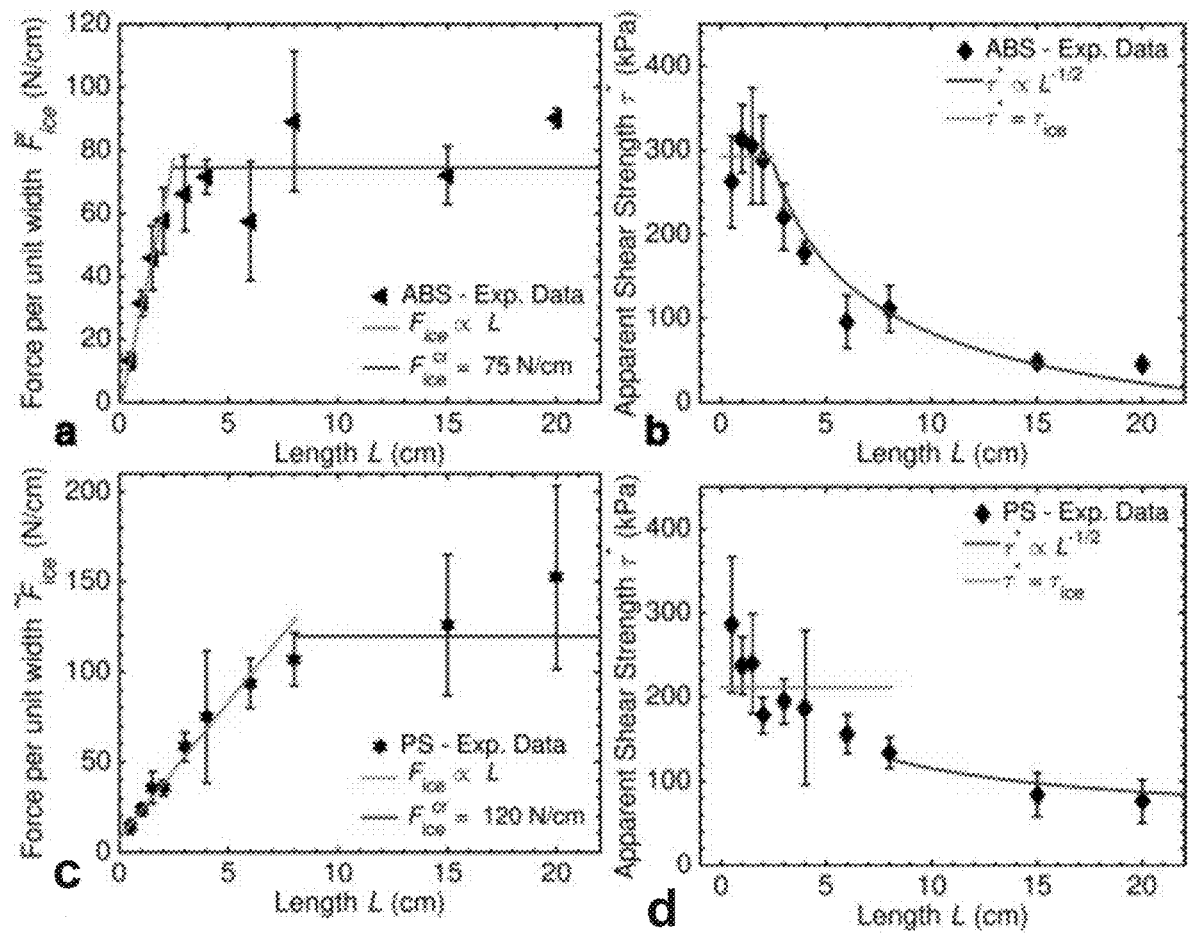

FIGS. 6A-6D. FIGS. 6A-6D show fracture of ice from acrylonitrile butadiene styrene (ABS) and polystyrene (PS) materials prepared in accordance with certain aspects of the present disclosure. In FIG. 6A, a force per unit width required to detach ice from ABS is shown. In FIG. 6B, an apparent ice adhesion strength of ABS is shown. After $L_c$=10 cm, the force becomes constant and $\tau^*_{ice}$ begins to decrease. At L=20 cm, $\tau^*_{ice}$=86±30 kPa. In FIG. 6C, a force unit width required to detach ice from PS is shown. In FIG. 6D, an apparent ice adhesion strength of PS is shown. After $L_c$=8.1 cm, the force becomes constant and $\tau^*_{ice}$ begins to decrease. At L=20 cm, $\tau^*_{ice}$=76±25 kPa.

Figures 7A, 7B, 7C, 7D:
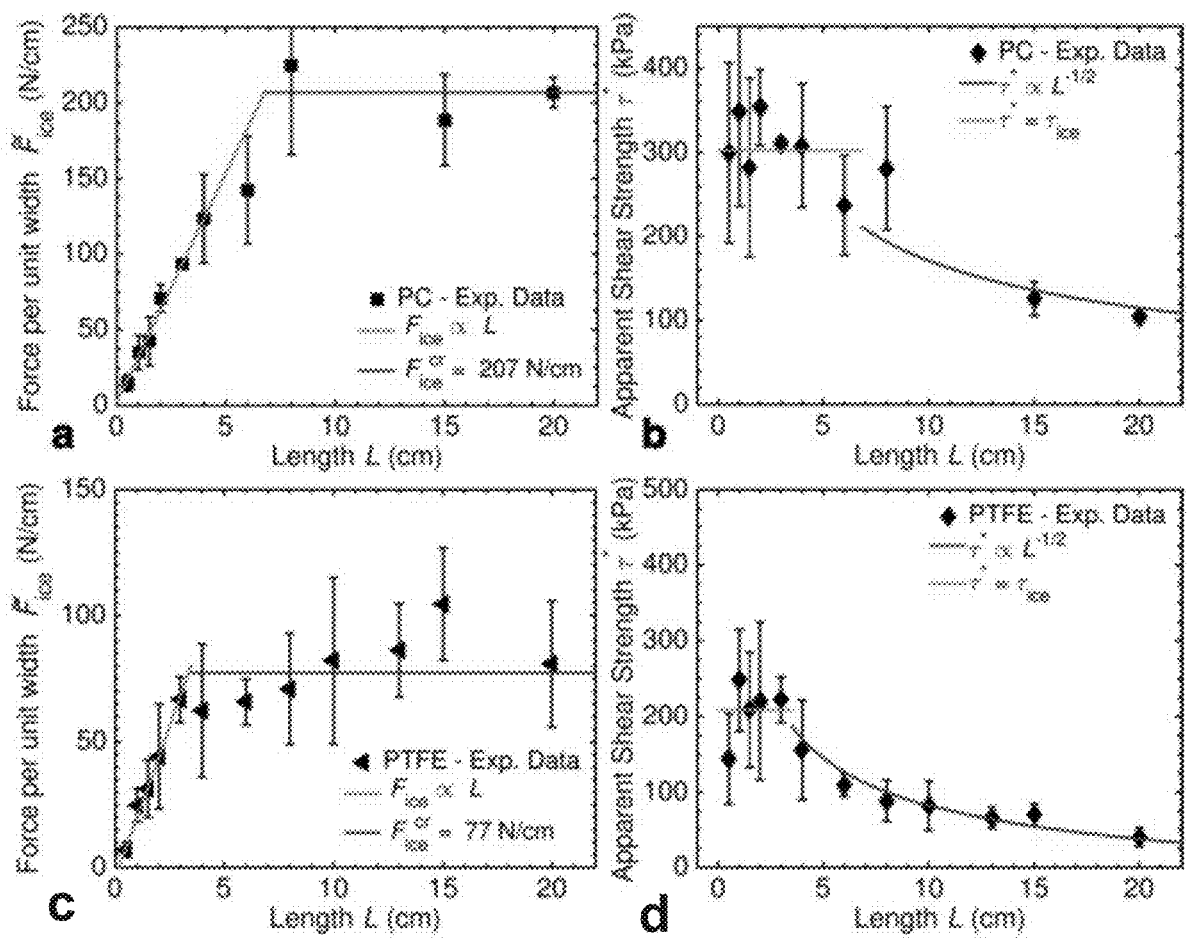

FIGS. 7A-7D. In FIGS. 7A-7D fracture of ice from polycarbonate (PC) and polytetrafluoroethylene (PTFE) materials prepared in accordance with certain aspects of the present disclosure are shown. In FIG. 7A, a force per unit width required to detach ice from PC is shown. In FIG. 7B, an apparent ice adhesion strength of PC is shown. After Lc=6.5 cm, the force becomes constant and $\tau^*_{ice}$ begins to decrease. At L=20 cm, $\tau^*_{ice}$=103±11 kPa. In FIG. 7C, a force per unit width required to detach ice from PTFE is shown. In FIG. 7D, an apparent ice adhesion strength of PTFE 15 shown. After $L_c$=3.5 cm, the force becomes constant and $\tau^*_{ice}$ begins to decrease. At L=20 cm, $\tau^*_{ice}$=39±3.9 kPa.

Figures 8A, 8B, 8C, 8D:
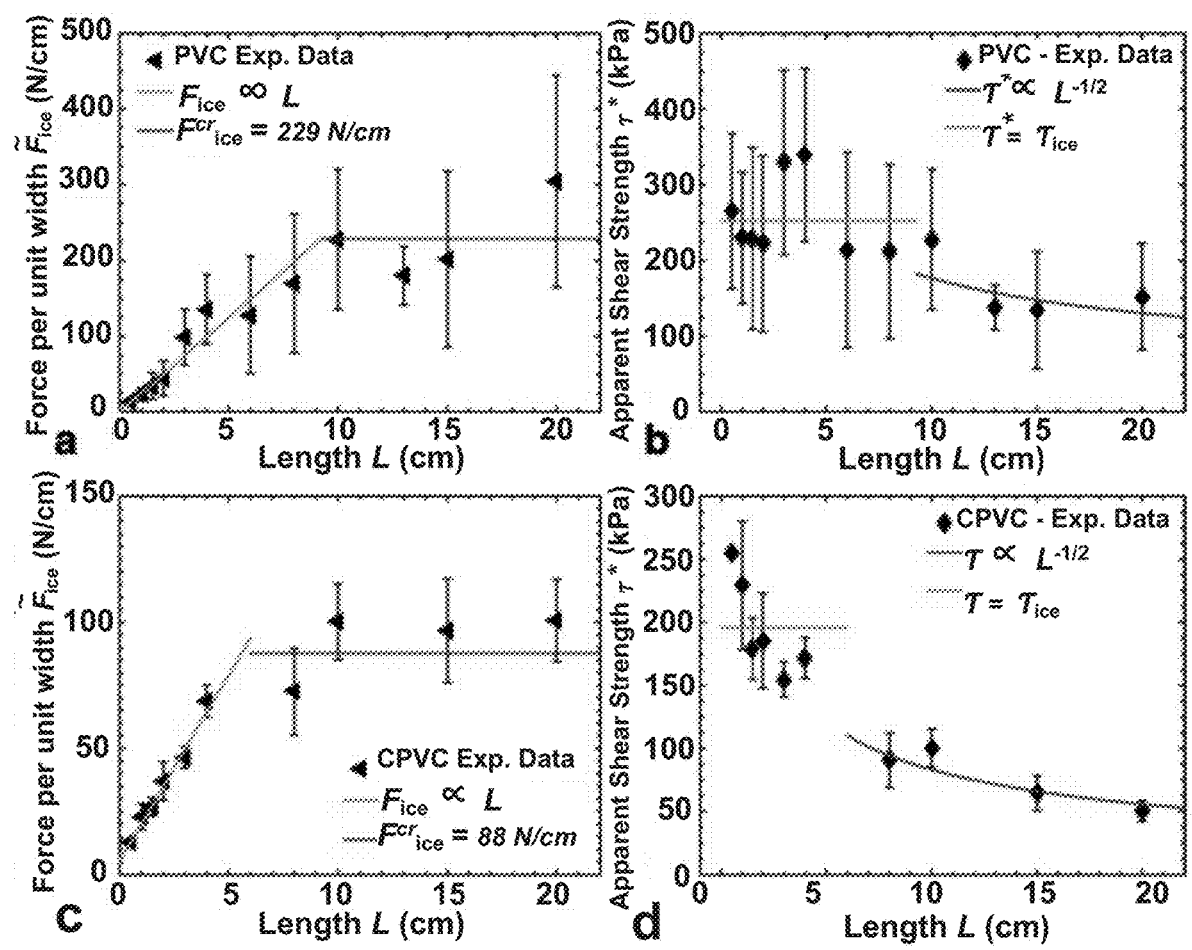

FIGS. 8A-8D. In FIGS. 8A-8D, fracture of ice from polyvinylchloride (PVC) and chlorinated polyvinylchloride (CPVC) materials prepared in accordance with certain aspects of the present disclosure are shown. In FIG. 8A, a force per unit width required to detach ice from PVC is shown. In FIG. 8B, an apparent ice adhesion strength of PVC. After $L_c$=9.3 cm, the force becomes constant and $\tau^*_{ice}$ begins to decrease. At L=20 cm, $\tau^*_{ice}$=114±26 kPa. In FIG. 8C, a force per unit width required to detach ice from CPVC is shown. In FIG. 8D, an apparent ice adhesion strength of CPVC. After Lc=5.6 cm, the force becomes constant and $\tau^*_{ice}$ begins to decrease. At L=20 cm, $\tau^*_{ice}$=67±7.1 kPa.

Figures 9A, 9B, 9C, 9D:
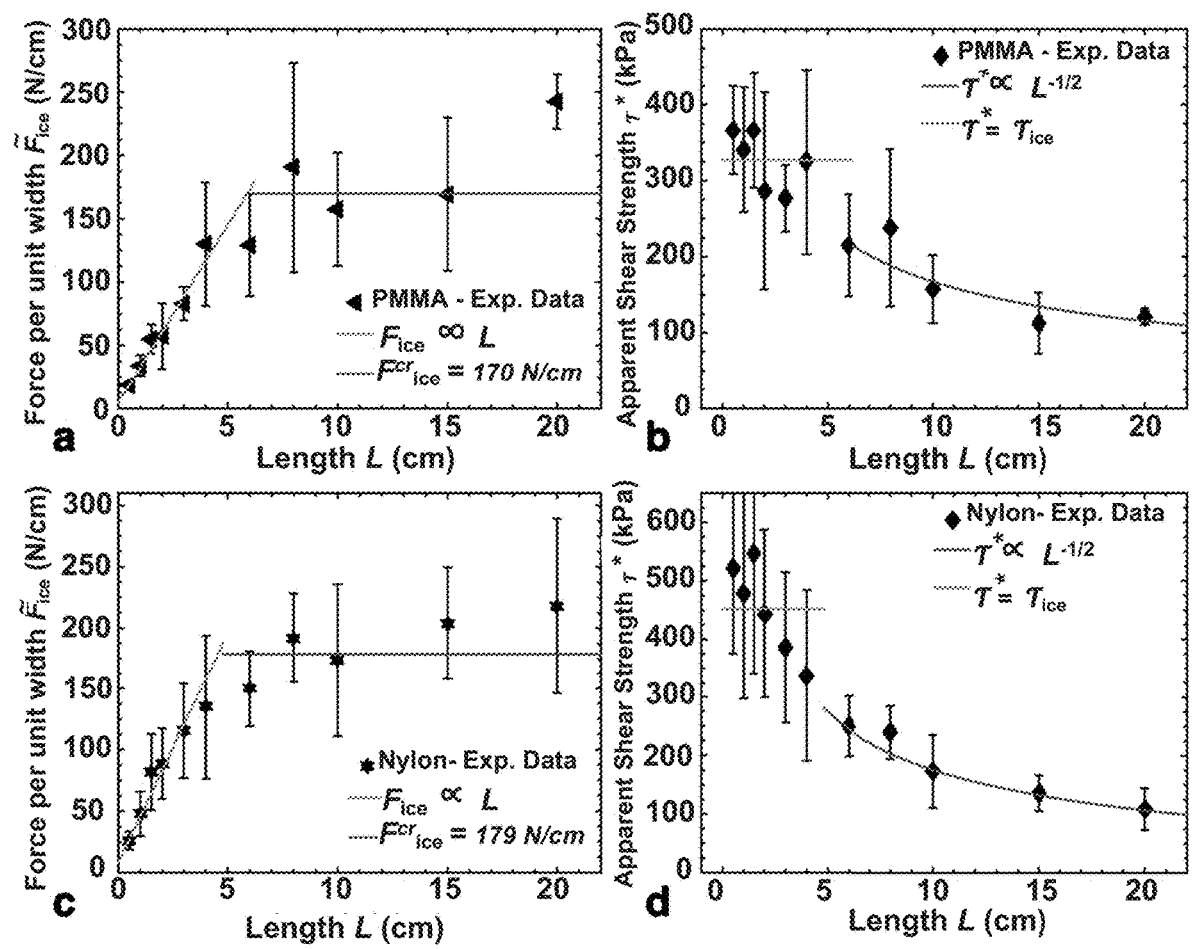

FIGS. 9A-9D. FIGS. 9A-9D show fracture of ice from polymethylmethacrylate (PMMA) and polyamide (Nylon) materials prepared in accordance with certain aspects of the present disclosure. In FIG. 9A, a force per unit width required to detach ice from PMMA is shown. In FIG. 9B, an apparent ice adhesion strength of PMMA is shown. After $L_c$=6.2 cm, the force becomes constant and $\tau^*_{ice}$ begins to decrease. At L=20 cm, $\tau^*_{ice}$=121±11 kPa. In FIG. 9C, a force per unit width required to detach ice from Nylon is shown. In FIG. 9D, an apparent ice adhesion shear strength of Nylon is shown. After $L_c$=4.8 cm, the force becomes constant and $\tau^*_{ice}$ begins to decrease. At L=20 cm, $\tau^*_{ice}$=89±11 kPa.

Figures 10A, 10B, 10C, 10D:
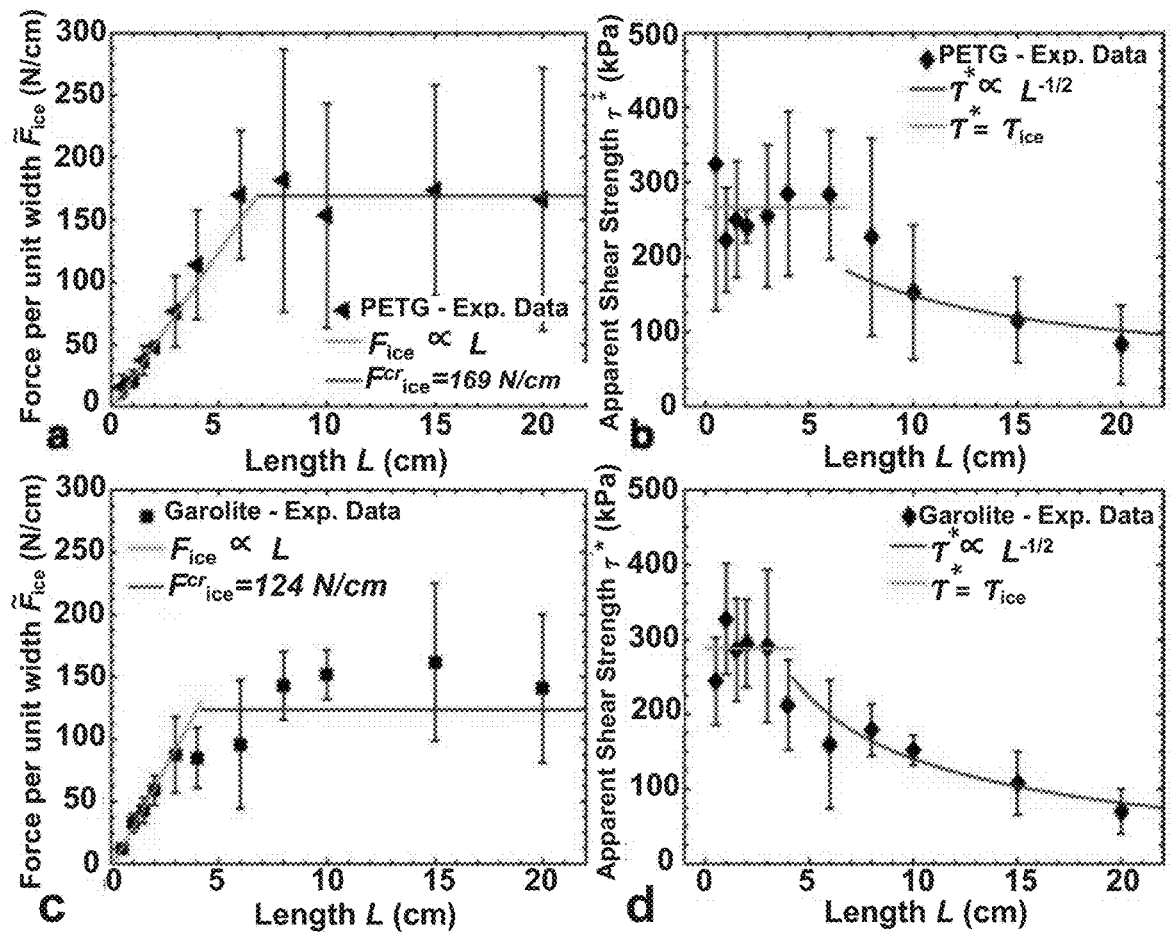

FIGS. 10A-10D. In FIGS. 10A-10D, fracture of ice from glycol-modified polyethylene terephthalate (PETG) and fiberglass-epoxy laminate (GAROLITE™ fiberglass laminate) materials prepared in accordance with certain aspects of the present disclosure are shown. In FIG. 10A, a force per unit width required to detach ice from PETG is shown. In FIG. 10B, an apparent ice adhesion strength of PETG is shown. After $L_c$=6.8 cm, the force becomes constant and $\tau^*_{ice}$ begins to decrease. At L=20 cm, $\tau^*_{ice}$=84±20 kPa. In FIG. 10C, a force per unit width required to detach ice from GAROLITE™ fiberglass laminate is shown. In FIG. 10D, an apparent ice adhesion strength of GAROLITE™ fiberglass laminate is shown. After $L_c$=4.9 cm, the force becomes constant and $\tau^*_{ice}$ begins to decrease. At L=20 cm, $\tau^*_{ice}$=70±30 kPa.

Figures 11A, 11B:
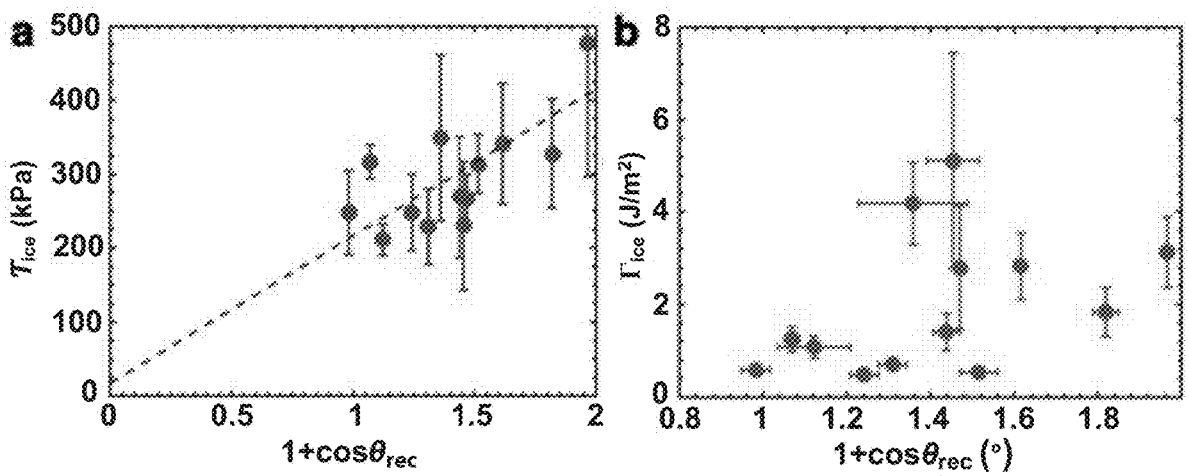

FIGS. 11A-11B. FIGS. 11A-11B show the effect of surface energy on anti-icing materials. In FIG. 11A, previous work shows that the work of adhesion ($W_a \propto 1+\cos\theta_{rec}$) is proportional to the ice adhesion strength. This trend is observed for the 13 different plastic materials tested. In FIG. 11B, however, there is no correlation between the work of adhesion and $\Gamma_{ice}$, indicating that all the effects of hydrophobicity only affect the strength-dominated regime of fracture.

Figure 12:
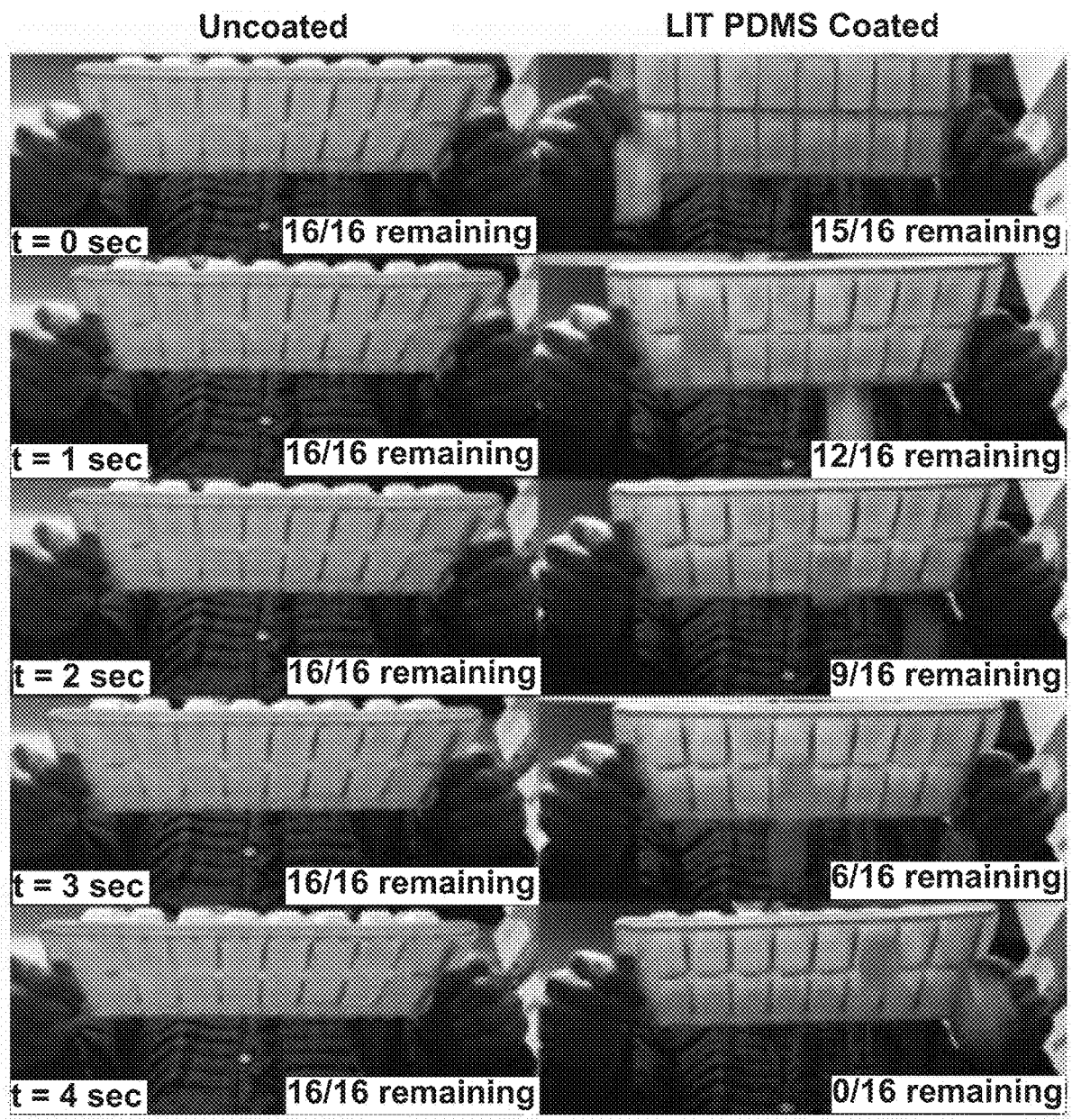

FIG. 12. FIG. 12 show photographs of a comparative experiment of an ice cube tray formed of an uncoated polymer material as compared to a low interfacial toughness (LIT) material prepared in accordance with certain aspects of the present disclosure. Ice cubes are frozen in one uncoated, and one coated (Mold Max STROKE, 40 wt. % silicone oil, thickness of about 1-2 μm) polypropylene trays at −20° C. overnight. The following morning, the trays are flipped. None of the ice cubes are removed from the uncoated tray, even after the application of a small torque. In contrast, 11/16 of the cubes simply fell from the coated ice cube tray solely under gravity, and the remaining 5 are easily removed after a very small torque is applied.

Figures 13A, 13B, 13C:
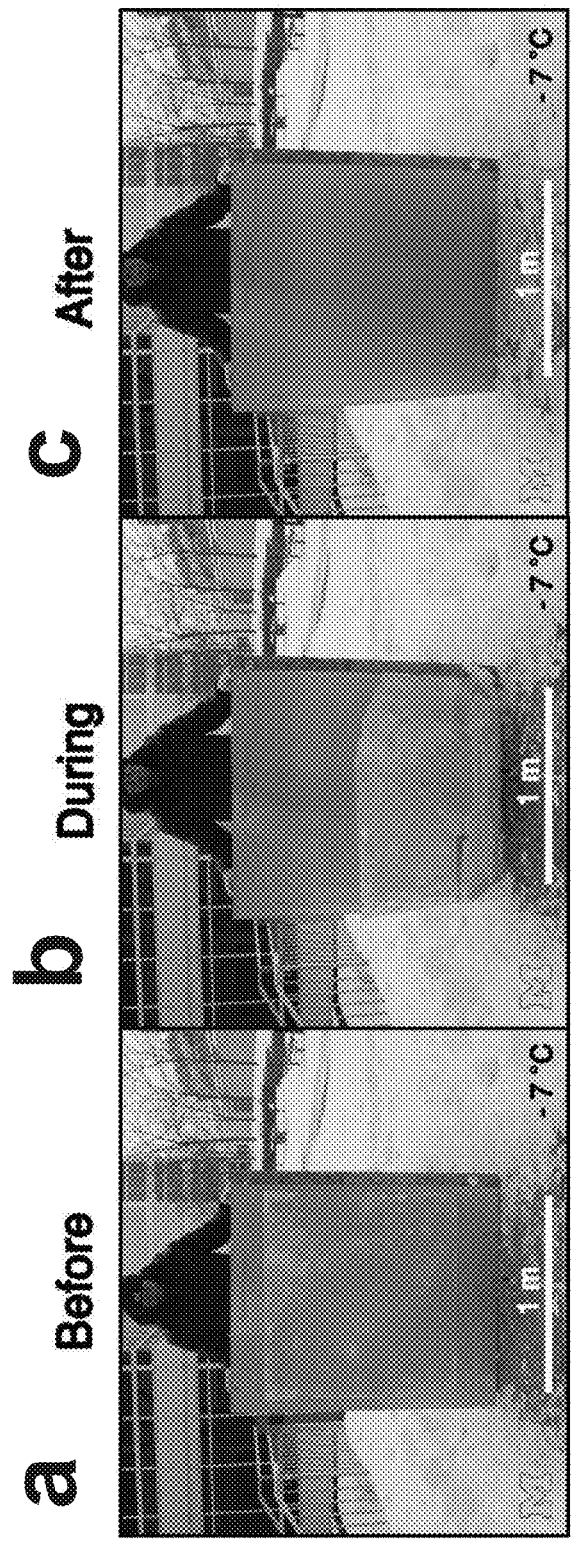

FIGS. 13A-13C. FIGS. 13A-13C show large-scale materials having low interfacial toughness (LIT) with ice prepared in accordance with certain aspects of the present disclosure. FIG. 13A shows the ice sheet before, FIG. 13B shows the ice sheet during, and FIG. 13C shows the ice sheet after fracture from the large specimen solely by its own weight and without exertion of any external force.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Unless otherwise indicated, percentages and ratios are by mass/weight.

The disclosures and relevant content of all references cited or discussed in this disclosure are incorporated by reference herein, unless otherwise indicated.

Example embodiments will now be described more fully with reference to the accompanying drawings.

Conventionally, a focus in the area of ice adhesion has been on developing materials and systems to control the adhesion strength of an interface (between ice and an underlying substrate). In accordance with certain aspects of the present disclosure, materials and systems are provided that instead control the toughness of an interface (between ice and underlying substrate). These materials and systems are useful for large-scale systems, and may be very different systems from previous conventional systems that control the strength of an interface. For example, in certain aspects, a coating prepared in accordance with the present disclosure that exhibits a low toughness may need to be both thin and stiff, whereas a conventional coating that controls strength may instead need to be thick and compliant.

As further background, certain conventional surface coatings have been developed to exhibit "icephobic" properties, including delaying water droplet freezing time, preventing or minimizing frost formation, and/or lowering ice adhesion strength ($\tau_{ice}$). Icephobic surfaces are generally defined as having an ice adhesion strengths ($\tau_{ice}$) of less than or equal to about 100 kPa. In comparison, structural materials like aluminum or steel have extremely high $\tau_{ice}$, around 1,600 kPa and 1,400 kPa, respectively. Further, it is desirable to be able to remove ice passively from a surface without inputting significant amounts of external energy (whether mechanical, chemical, or thermal) to remove the ice. The passive removal of ice typically requires much lower values of $\tau_{ice}$ for applications such as airplane wings ($\tau_{ice} \leq 40$ kPa). For other applications that experience even lower shear stresses, like power lines or boat hulls, ice adhesion strength values ($\tau_{ice}$) of less than or equal to about 20 kPa are typically required to enable passive ice removal. However, coatings or other materials having such low ice adhesion strengths are rare. Further, most mechanically durable coatings have not been capable of maintaining such low ice adhesion strengths over extended periods of use.

In accordance with certain aspects of the present disclosure, a new property has been discovered that controls interfacial failure of ice on a surface due to crack propagation, which is referred to herein as interfacial toughness. This has not before been measured for ice adhesion. Thus, the present disclosure provides low interfacial toughness (LIT) materials, which serve as a new class of anti-icing system materials having a distinct advantage of requiring only a low ice detachment force, independent of the interfacial area of adhered ice. From the traditional strength-based perspective of ice adhesion, LIT materials can display any possible $\tau_{ice}$ value. As discussed further herein, LIT materials only require a constant force to detach ice (rather than an increasing force), but such materials may be fabricated by durable engineering plastics, like polyethylene or polyvinylchloride, by way of non-limiting example.

In accordance with certain aspects of the present disclosure, durable, robust anti-icing materials are provided that require only low shear forces to remove ice.

As will be described further herein, an interfacial toughness ($\Gamma_{ice}$) to remove ice from the anti-icing coating may be less than or equal to about 1 J/m², optionally less than or equal to about 0.9 J/m², optionally less than or equal to about 0.8 J/m², optionally less than or equal to about 0.7 J/m², optionally less than or equal to about 0.6 J/m², optionally less than or equal to about 0.5 J/m², optionally less than or equal to about 0.4 J/m², optionally less than or equal to about 0.3 J/m² optionally less than or equal to about 0.25 J/m², optionally less than or equal to about 0.2 J/m² optionally less than or equal to about 0.15 J/m², optionally less than or equal to about 0.1 J/m², optionally less than or equal to about 0.05 J/m², and in certain variations, optionally less than or equal to about 0.01 J/m².

A shear force to remove ice from the anti-icing coating is dependent on thickness of the ice. Where a representative ice thickness is about 6 mm, a shear force to remove the ice from the anti-icing coating may be less than or equal to about 100 N/cm, optionally less than or equal to about 90 N/cm, optionally less than or equal to about 80 N/cm, optionally less than or equal to about 70 N/cm, optionally less than or equal to about 60 N/cm, optionally less than or equal to about 50 N/cm, optionally less than or equal to about 40 N/cm, optionally less than or equal to about 30 N/cm, optionally less than or equal to about 25 N/cm, optionally less than or equal to about 20 N/cm, and in certain variations, optionally less than or equal to about 15 N/cm. In certain aspects, a shear force to remove ice having a thickness of about 1 cm from the coating is less than or equal to about 100 N/cm or any of the values specified above.

In certain aspects, the durable anti-icing materials are provided as surface coatings on an article. Exemplary and non-limiting devices or articles include parts or components having surfaces potentially exposed to ice and snow conditions, including aircraft, vehicles, marine vessels and marine equipment, outdoor equipment, structures, and buildings, snow or ice removal equipment, outdoor recreational equipment, sports equipment, wind turbines, telecommunications equipment, power lines, combinations and equivalents thereof. In certain variations, the device is selected from the group consisting of: an aircraft, a vehicle, a marine vessel, outdoor equipment, snow or ice removal equipment, recreational equipment, a wind turbine, telecommunications equipment, power lines, and combinations thereof. Such anti-icing materials can provide long-term, durable anti-icing properties on such surfaces, including requiring only low shear forces to remove maintaining low ice adhesion strength over time.

When the anti-icing materials of the present disclosure are in the form of a coating on an article, they may be applied to a variety of different surfaces or substrates. The coating materials of the present disclosure are generally compatible with a wide range of substrate materials, including engineered materials. Therefore, in certain exemplary embodiments, the substrate may be porous or non-porous and may formed of plastic or polymeric materials, metallic materials, inorganic materials, organic materials (such as materials derived from plants or animals), and combinations thereof. In certain aspects, the substrate is constructed from one or more materials selected from the group consisting of metal, such as sheet metal, cast metal, forged metal, and the like, composite materials comprising resin and reinforcing materials, plastic or polymeric materials, screens, mesh, paper, fibrous materials and cloth, glass, foam, equivalents, and combinations thereof. The substrate may also comprise a plurality of three-dimensional structures, such as pillars, nubs, posts, ribs, and the like.

The anti-icing coating includes at least one polymer. The polymer in the anti-icing coating according to certain aspects of the present disclosure may be selected from the group consisting of: polyvinyl chloride (PVC), polydimethylsiloxane (PDMS), polyalkylenes, such as polyethylene (PE), ultra-high molecular weight polyethylene (UHMWPE), low density polyethylene (LDPE), polypropylene (PP), polycarbonate (PC), polystyrene (PS), polymethylmethacrylate (PMMA), glycol-modified polyethylene terephthalate (PETG), polyamide (nylon), acrylonitrile butadiene styrene (ABS), polyvinylchloride (PVC), chlorinated polyvinylchloride (CPVC), polytetrafluoroethylene (PTFE), a fiberglass-epoxy laminate, and combinations thereof.

The polymer may be present in the anti-icing polymer coating at greater than or equal to about 10% to less than or equal to about 100% by weight of the overall anti-icing material coating, and in certain aspects, optionally at greater than or equal to about 40% to less than or equal to about 99%. The amount of polymer present in the anti-icing material coating may be greater than or equal to about 40% by weight, optionally greater than or equal to about 45% by weight, optionally greater than or equal to about 50% by weight, optionally greater than or equal to about 55% by weight, optionally greater than or equal to about 60% by weight, optionally greater than or equal to about 65% by weight, optionally greater than or equal to about 70% by weight, optionally greater than or equal to about 75% by weight, optionally greater than or equal to about 80% by weight, optionally greater than or equal to about 85% by weight, and in certain variations, optionally greater than or equal to about 90% by weight, and in certain variations, optionally greater than or equal to about 95% by weight of the anti-icing material coating.

In certain variations, the plasticizing agent may be a liquid or oil. The plasticizing agent may be selected from one or more of the following: polydimethylsiloxane (PDMS) oil (e.g., un-crosslinked, trimethyl-terminated PDMS chains), polymethylphenylsiloxane (PMPS) oil, polymethylhydrosiloxane (PMHS), polyalkylene oils, such as polyisobutylene, perfluoroether oils, KRYTOX™ lubricant oil commercially available from DuPont, natural oils, such as coconut oil, soybean oil, vegetable oil, cod liver oil, safflower oil, eucalyptus oil, fish oils (e.g., salmon, tuna, krill, squid), rapeseed oil, fluorinated silicone oils, perfluorodecalin, FLUORINERT™ fluorocarbon oils, including perfluoropolyether oil (PFPE), such as FOMBLIN™ inert PFPE, castor oil, mineral oils, functionalized silicone oils, such as hydroxy, isocyanate, diol or other reactive silicone oils, functionalized perfluoropolyethers such as SARTOMER CN4002™ oil, and combinations thereof. In other aspects, the liquid may be a plasticizing agent, such as diisodecyl adipate (DIDA), medium-chain triglyceride (MCT), like fractionated coconut oil, diundecyl phthalate (DUP) and combinations thereof, by way of example. The plasticizing agent may also include one or more solvents, such as alkanes, like hexane, by way of non-limiting example.

The amount of plasticizing agent (e.g., liquid or oil) in the anti-icing polymer coating may be greater than 0% to less than or equal to about 90% by weight of the overall material coating including the polymer, optionally greater than or equal to about 1% to less than or equal to about 60% by weight of the overall material coating. The amount of plasticizing agent present in the anti-icing material coating may be greater than or equal to about 1% by weight, optionally greater than or equal to about 5% by weight, optionally greater than or equal to about 10% by weight, optionally greater than or equal to about 15% by weight, optionally greater than or equal to about 20% by weight, optionally greater than or equal to about 25% by weight, optionally greater than or equal to about 30% by weight, optionally greater than or equal to about 35% by weight, optionally greater than or equal to about 40% by weight, optionally greater than or equal to about 45% by weight, and in certain variations, optionally greater than or equal to about 50% by weight, and in certain variations, optionally greater than or equal to about 55% by weight of the anti-icing material coating.

In certain embodiments, the anti-icing coating contains solely the plasticizing agent and the polymer. Thus, the anti-icing polymer coating may consist essentially of or alternatively, consist of, the plasticizing agent and the polymer. In other embodiments, the anti-icing polymer coating may include other materials and additives known in the art, including by way of example, particulate and reinforcement materials, such as ceramic, metallic, or polymeric fillers, residual solvents, processing agents, colorants like pigments and dyes, and the like.

In certain variations, where the anti-icing materials of the present disclosure are in the form of a polymeric coating on a surface or substrate, the coating may have a thickness of less than or equal to about 1.6 mm, optionally less than or equal to about 1.5 mm, optionally less than or equal to about 1.25 mm, optionally less than or equal to about 1 mm, optionally less than or equal to about 750 µm, optionally less than or equal to about 500 mm, optionally less than or equal to about 250 µm, optionally less than or equal to about 100 µm, optionally less than or equal to about 90 µm, optionally less than or equal to about 80 µm, optionally less than or equal to about 70 µm, optionally less than or equal to about 60 µm, optionally less than or equal to about 50 µm, optionally less than or equal to about 40 µm, optionally less than or equal to about 30 µm, optionally less than or equal to about 20 µm, optionally less than or equal to about 10 µm, optionally less than or equal to about 9 µm, optionally less than or equal to about 8 µm, optionally less than or equal to about 7 µm, optionally less than or equal to about 6 µm, optionally less than or equal to about 5 µm, optionally less than or equal to about 4 µm, optionally less than or equal to about 3 µm, optionally less than or equal to about 2 µm, optionally less than or equal to about 1µm, optionally less than or equal to about 900 nm, optionally less than or equal to about 800 nm, optionally less than or equal to about 700 nm, optionally less than or equal to about 600 nm, optionally less than or equal to about 500 nm, optionally less than or equal to about 400 nm, optionally less than or equal to about 300 nm, optionally less than or equal to about 200 nm, optionally less than or equal to about 100 nm, optionally less than or equal to about 90 nm, optionally less than or equal to about 80 nm, optionally less than or equal to about 70 nm, optionally less than or equal to about 60 nm, optionally less than or equal to about 50 nm, optionally less than or equal to about 40 nm, optionally less than or equal to about 30 nm, optionally less than or equal to about 20 nm, and in certain variations, optionally less than or equal to about 10 nm. In certain aspects, the anti-icing coating materials of the present disclosure may optionally have a thickness ranging from greater than or equal to about 10 nm to less than or equal to about 100 and in certain other aspects, optionally greater than or equal to about 10 nm to less than or equal to about 1 µm.

The present disclosure provides a new class of materials that exhibit a unique property in that a force required to remove adhered ice may be independent of the interfacial area, so that the shear force necessary to remove a few square centimeters or a few hundred square meters of ice remains the same. These materials thus exhibit low interfacial toughness (LIT) with ice, and counter intuitively, LIT materials do not require a low ice adhesion strength ($\tau_{ice}$). By way of background, the field of interfacial-fracture mechanics typically focuses on the role of interfacial toughness, rather than interfacial strength, as an important fracture parameter. However, the role of interfacial toughness has not been explored previously for ice interfaces. A material's interfacial toughness with ice ($\Gamma_{ice}$) is important for reducing ice accretion on large-scale structures. For example, by designing LIT materials so that $\Gamma_{ice}$ less than or equal to about 1 J/m², the force per area necessary to dislodge ice from a device, such as a wind turbine blade, is F/A«1 kPa for a material that exhibits $\tau_{ice}$>100 kPa When a force is applied to an ice-material interface, two modes of failure are possible: rupture of the entire adhesive bond or the propagation of an interfacial crack. Previously only the former has been considered, but crack propagation becomes the dominant failure mode when the size of the interface is much greater than the cohesive length, $\xi=E\Gamma/\tau^2$, where E is the effective modulus of the two materials across the interface, and $\tau$ is the interfacial shear strength and $\Gamma$ is the interfacial toughness, respectively. For a crack larger than the cohesive length, it is always energetically favorable to open an additional length of crack. Most importantly, once the force necessary to open this critical crack length has been reached, no additional force is necessary to propagate the crack, no matter how large the interface may be. For a sheet of ice with thickness h, it can be shown that the critical crack length ($L_c$) is given by $L_c=1.4\sqrt{E_{ice}\Gamma_{ice}h/\tau_{ice}^2}$, where $E_{ice}$ is the modulus of ice (approximately 8.5 GPa).

In certain aspects, the anti-icing coating has an interfacial toughness ($\Gamma_{ice}$) with any of the values specified above, for example, ranging from less than or equal to about 1 J/m² to less than or equal to about 0.01 J/m².

In certain variations, the anti-icing coating has a surface area (or covers a surface area) of greater than or equal to about 3 cm², optionally greater than or equal to about 5 cm², optionally greater than or equal to about 10 cm², optionally greater than or equal to about 25 cm², optionally greater than or equal to about 50 cm², optionally greater than or equal to about 75 cm², optionally greater than or equal to about 100 cm², optionally greater than or equal to about 250 cm², optionally greater than or equal to about 500 cm², optionally greater than or equal to about 750 cm², optionally greater than or equal to about 1 m², optionally greater than or equal to about 10 m², optionally greater than or equal to about 25 m², optionally greater than or equal to about 50 m², optionally greater than or equal to about 75 m², optionally greater than or equal to about 100 m², optionally greater than or equal to about 500 m², optionally greater than or equal to about 1,000 m², and in certain variations, optionally greater than or equal to about 10,000 m². The present disclosure also contemplates a device having at least a portion of a surface covered by the anti-icing coating, where the surface area of the surface covered by the anti-icing coating is any of the ranges specified above.

In other variations, the anti-icing coating may have an actual length that is greater than the critical length ($L_c$) for the anti-icing material. In certain variations, the anti-icing coating has a critical length ($L_c$) of greater than or equal to about 2.5 cm, optionally greater than or equal to about 3 cm, optionally greater than or equal to about 4 cm, optionally greater than or equal to about 5 cm, optionally greater than or equal to about 6 cm, optionally greater than or equal to about 7 cm, optionally greater than or equal to about 8 cm, and in certain variations, optionally greater than or equal to about 9 cm. The present disclosure also contemplates a device having at least a portion of a surface covered by the anti-icing coating, where the anti-icing coating has a critical length ($L_c$) of greater than or equal to about 2.5 cm and covers a portion of the surface of the device that has a length greater than the critical length (e.g., the actual length of the anti-icing coating on the device surface is greater than 2.5 cm). In certain aspects, a shear force to remove ice remains substantially constant (for example, deviating less than or equal to about 5%, optionally less than or equal to about 3%, and in certain aspects, deviating less than or equal to about 1%) when a length of the anti-icing coating is greater than a critical length ($L_c$) of the anti-icing coating.

In certain other variations, the present disclosure provides a device that comprises a surface and an anti-icing coating having low interfacial toughness with ice disposed on the surface of the device. The anti-icing coating comprises a polymer and a plasticizing agent present at greater than 0% by mass in the anti-icing coating. A thickness of the anti-icing coating may be less than or equal to about 1.6 mm and in certain variations is less than or equal to about 100 micrometers (µm) or any of the values discussed previously above. The anti-icing coating may have any of the properties or attributes described above, including an interfacial toughness with ice of less than or equal to about 1 J/m². In certain variations, the device is selected from the group consisting of: an aircraft, a vehicle, a marine vessel, outdoor equipment, snow or ice removal equipment, recreational equipment, a wind turbine, telecommunications equipment, power lines, and combinations thereof.

In other aspects, the present disclosure contemplates a method of forming an anti-icing surface on a substrate comprising applying an anti-icing coating of a portion of a surface of the substrate. The anti-icing coating comprises a polymer and a plasticizing agent present at greater than 0% by mass in the anti-icing coating. After being applied, and optionally dried and/or solidified, the anti-icing coating has a thickness of less than or equal to about 1.6 mm and optionally less than or equal to about 100 micrometers (µm). The anti-icing coating disposed on the surface of the device has a low interfacial toughness with ice, for example, an interfacial toughness with ice that is less than or equal to about 1 J/m².

The substrate may be part of a device, such that in certain variations, the anti-icing coating may be applied to a device selected from the group consisting of: an aircraft, a vehicle, a marine vessel, outdoor equipment, snow or ice removal equipment, recreational equipment, a wind turbine, telecommunications equipment, power lines, and combinations thereof In certain aspects, a precursor of the anti-icing coating may be applied to the substrate. The precursor may be a monomer, oligomer, polymer, or copolymer to be cured and/or crosslinked. The precursor may form any of the polymers discussed above. The method also comprises reacting, curing and/or crosslinking the precursor to form a polymer. Curing or cross-linking depends upon the precursor used, but may include chemical reaction to facilitate polymerization, exposure to thermal energy, actinic radiation or e-beam, and the like. These coatings can be applied by spinning, dipping, spraying, or painting onto essentially all substrates of any size. In certain aspects, the polymers may be thermosets and the method includes curing and crosslinking concurrently. For example, thermosets may be crosslinked by curing either at elevated temperature or at room temperature. The coating fabrication methodology and resulting interfacial toughness for ice fabricated in accordance with the present disclosure are set forth in Table 1 and described further below.

In certain aspects, the method may include mixing a plasticizing agent and a polymer or precursor and applying the mixture to the surface of the substrate. In certain other aspects, after the reacting or curing, the method may further include introducing a plasticizing agent into polymer after it has been applied to the substrate.

EXAMPLES

Interfacial properties between ice and many different engineering plastics are explored. The following are purchased from McMaster at a thickness of t=1.58 mm and include: ultra-high molecular weight polyethylene (UHMWPE), low density polyethylene (LDPE), polypropylene (PP), polycarbonate (PC), polystyrene (PS), polymethylmethacrylate (PMMA), glycol-modified polyethylene terephthalate (PETG), nylon, acrylonitrile butadiene styrene (ABS), polyvinylchloride (PVC), chlorinated polyvinylchloride (CPVC), polytetrafluoroethylene (PTFE), and a fiberglass-epoxy laminate (GAROLITE™ fiberglass laminate).

To fabricate PDMS, Mold Max STROKE™ (Smooth-On Inc.) is mixed in a 10:1 base:crosslinker ratio, following the manufacturer's instructions. 2 mL of toluene is added to 10 g of total material, and the mixture is vortexed until homogeneous. The solution is then poured onto Al metal (Al 6061 from McMaster) substrates measuring 6×22×0.08 cm after sanding (80 Grit) and cleaning. To fabricate a more icephobic system, the same procedure is followed, but with a 40 wt. % silicone oil (100 cP, Sigma Aldrich) mixture of the Mold Max STROKE™. Both these systems are cured at room temperature overnight. For visualization, OIL-RED-O™ dye (Alfa Aesar) is added to the toluene (10 mg/mL) before mixing with the silicone rubber. To fabricate a much thinner (thickness (t) approximately 1 μm) sample, a solution of Mold Max STROKE™ and 40 wt. % silicone oil is formed in hexane at an overall concentration of 25 mg/mL. Note that the typical thickness of these coatings without dilution is t about 1 mm.

Another icephobic PDMS is fabricated from SYLGARD 184™ (Dow Corning) in a 10:1 base:crosslinker ratio, per manufacturer instructions. The mixture is vortexed until homogeneous, degassed to remove bubbles, and poured onto the same size Al substrates as above. The sample is then cured at 150° C. for 1 hour. For icephobic SYLGARD 184™, 25 wt. % silicone oil (100 cP, Sigma Aldrich) is added.

To fabricate plasticized PVC, polyvinyl chloride ($M_w$=120,000, Scientific Polymer) is dissolved in a 60/40 vol. % mixture of acetone and n-methyl pyrrolidone (Sigma Aldrich) at concentrations of 200 mg/mL, 100 mg/mL, 50 mg/mL, and 25 mg/mL. Once fully dissolved, medium chain triglyceride oil (MCT, Jedwards International) is added to the solution at 5-50 wt. %, and the systems are homogenized using a vortexer at room temperature. The solutions are then poured onto aluminum substrates. The coated Al samples are placed on a 35° C. hotplate for 10 minutes to evaporate the acetone, and then a 70° C. hotplate overnight to remove the NMP. This results in coatings all exhibiting $\theta_{adv}/\theta_{rec}$=92°/80°, but with variable thickness, from about 1 μm to about 150 μm, as measured using a micrometer.

Ice Adhesion Measurement.

The measurement of $\tau_{ice}$ or $\tilde{F}_{ice}$ is conducted similar to previously reported techniques. However, two minor differences are worth noting. First, to observe a critical length during ice-adhesion testing, a larger Peltier-plate system is required. The new Peltier-plate system used here (Laird Technologies) measures 22 cm in length and 6 cm in width. Second, to evaluate different lengths of interfacial area in a relatively short amount of time, the entire substrate is used for ice-adhesion testing. For example, a typical test is shown in the inset of FIG. 1D, where 11 different pieces of ice are all frozen together. By always placing shorter length samples closer to the force-gauge arm, and therefore dislodging them before the samples with longer lengths, it is confirmed that the measurements did not affect one another. In all experiments, lengths from 0.5 cm to 20 cm are used. The height and width of ice are fixed at h=0.6 cm and w=1 cm, respectively.

To measure lengths greater than 20 cm, the entire ice-adhesion setup is moved into a walk-in freezer held at −20° C. The Peltier system is removed and the stage used to hold the samples is extended by securing a 1.2 m×0.1 m aluminum sheet to the original frames. The entire system is precisely leveled using a bubble level accurate to 1°. A 1 m×1 cm×5 mm (L×w×h) cuvette is fabricated by boring an elongated channel from a piece of stock PP. The sample to be tested is secured using clamps, and the PP cuvette is placed on top. Deionized water is then poured into the cuvette and the ice is allowed sufficient time to fully freeze. Once frozen, the force gauge system (Nextech) then contacts the PP cuvette near the base of the substrate, at a controlled velocity of 74 μm/s. The maximum force at which fracture occurred is recorded, and the reported values are the average of a minimum of three measurements.

FIG. 12 shows photographs of a comparative experiment of an ice cube tray formed of an uncoated polymer material as compared to a low interfacial toughness (LIT) material prepared in accordance with certain aspects of the present disclosure. Commercial ice cube trays are purchased from Kitch. A blend of Mold Max STROKE™+40 wt. % silicone oil (100 cP, Sigma) is formed in hexane at a concentration of 25 mg/mL. 30 mL of solution is sprayed onto the ice cube tray using an ATD Tools 6903 high-volume-low-pressure spray gun. The coating is allowed to cure at room temperature overnight. To fabricate an identical geometry of ice cube tray out of an icephobic material, VYTAFLEX 40™ (Smooth-On Inc.) is mixed with 15 wt. % safflower oil (high linoleic, Jedwards International) without dilution. Once homogeneous, the prepolymer mixture is poured over the back of the tray to cast a replicate mold. The icephobic rubber is allowed to cure at room temperature overnight. Force required to detach the ice from the tray is measured by clamping three corners of the inverted iced tray and applying a normal force on the fourth corner with a force gauge. For comparison, the force at which 50% or more of the ice cubes detached is recorded for the uncoated and LIT tray.

Aluminum bars of dimensions 1.22 m×2.54 cm×0.3175 cm (McMaster) are used to perform cantilever and off-center loaded beam flex tests. One of the bars is rendered icephobic after being sanded, cleaned and coated with Mold Max STROKE™ (t≈0.65 mm). Another bar is coated using a solution of Mold Max STROKE™ and 40 wt. % silicone oil (t≈1 pm) formed in hexane at an overall concentration of 25 mg/mL. After curing at room temperature overnight, the bars are taped on the edges using commercial tape and capped at the ends to hold water along a length of 1m. The bars are moved to the walk-in freezer (−20° C.) and rested on lab jacks. The entire system is precisely leveled using a bubble level accurate to 1°. Deionized water is poured and the ice is allowed sufficient time to fully freeze. Once frozen, the tape and end caps are carefully removed to expose the adhered ice sheet (1 m×2.54 cm×0.8 cm).

To perform cantilever beam bending tests, one end of the now composite Al-ice beam is clamped while the free end is threaded to the force gauge to apply a force perpendicular to the beam plane. When the ice is fractured from the surface, the force is measured and the final deflection of the beam is noted using a digital angle gauge (Wixey) also attached to the free end of the beam. To perform a four-point loaded beam test, the ends of the composite ice-Al specimen are held and flexed. The minimum deflection to cause ice-Al interface fracture (LIT) and the maximum deflection obtainable (Al and icephobic) is analyzed using ImageJ™ software. Load exerted on the beam is estimated from the measured deflections using beam theory.

FIGS. 13A-13C show large-scale materials having low interfacial toughness (LIT) with ice prepared in accordance with certain aspects of the present disclosure. Ice with dimensions 0.9 m×0.9 m×0.01 m are frozen over an aluminum sample coated with low interfacial toughness (LIT) PDMS. The coated aluminum sample is supported with a wooden backing to prevent bending. Upon freezing, the entire assembly is rotated at a 98° angle. FIG. 13A shows the ice sheet before, FIG. 13B shows the ice sheet during, and FIG. 13C shows the ice sheet after fracture from the large specimen solely by its own weight and without exertion of any external force. The ice adhesion strength of the interface is an exceedingly low 0.09 kPa.

Surface Analysis

Advancing and receding contact angles are measured using a Ramé-Hart 200 F1™ contact angle goniometer using the standard sessile drop method. Scanning electron microscopy (SEM) is performed using a Phillips XL30 FEG™. Surface profilometry is performed using an Olympus LEXT™ interferometer with a step size of 1.25 µm and an overall scan area of 1.3×1.3 mm. Three different locations are averaged. The root mean squared roughness, $S_q$, is determined from the height-maps generated by the microscope. The data are flattened, and the noise is removed before calculating $S_q$. The thickness of the samples is measured using either a micrometer (for samples where the coating could be delaminated), or in cross-section using SEM. An average of six different locations is reported.

Statistical Analysis

Error bars are obtained for each length of ice evaluated by testing a minimum of five points per length. In contrast to typical methods where a single area is evaluated, $\tau_{ice}$ is given by the slope of the $\tilde{F}_{ice}$ against L curve in the linear (strength) regime. Oftentimes it is ambiguous if lengths very close to $L_c$ are within the strength regime, and should therefore be taken into the linear fit. For consistency, lengths are included within the linear fit that minimized the overall error in the measurement of $\tau_{ice}$. The error in the ice adhesion strength, $\Omega_{\tau_{ice}}$, is found using, $$\Omega_{\tau_{ice}} = \sqrt{\frac{1}{\Delta}\sum \frac{1}{\Omega_L^2}} \tag{1}$$

where $\Omega_L$ is the standard deviation in the measurement of the detachment force recorded at each length of ice, and $\Delta$ is given by, $$\Delta = \sum \frac{1}{\Omega_L^2} \sum \frac{\tilde{F}_L^2}{\Omega_L^2} - \left(\sum \frac{F_L}{\Omega_L}\right)^2 \tag{2}$$

with $\tilde{F}_L$ being the mean force per unit width measured at each length L of ice.

The critical interfacial length for the transition between the strength- and toughness-controlled-regimes, $L_c$, is found from the intersection of the linear fit in the strength regime and the mean value of $\tilde{F}_{ice}^{cr}$ in the toughness regime. Once the best fit for $\tau_{ice}$ is found using the method described above, $\tilde{F}_{ice}^{cr}$ is determined by averaging the recorded $\tilde{F}_{ice}$ values for all $L>L_c$. Error in the intercept of the best fit line, $\Omega_{\tau_b}$, for $\tau_{ice}$ is found using, $$\Omega_{\tau_b} = \sqrt{\frac{1}{\Delta}\sum \frac{\tilde{F}_L^2}{\Omega_L^2}} \tag{3}$$

The error in $L_c$ is then found in the following way. The value of $\tilde{F}_{ice}^{cr}$ is assumed to be correct, and perturbed $\tau_{ice}$ using $\Omega_{\tau_{ice}}$ and $\Omega_{\tau_b}$. The maximum and minimum deviations are computed from $L_c$ using $y_{max}=(m-\delta_m)x+(b-\delta_b)$ and $y_{min}=(m+\delta_m)x+(b+\delta_b)$, where the best fit for $\tau_{ice}$ is given by the line $y=mx+b$, and the error in the slope and intercept are $\delta_m=\Omega_{\tau_{ice}}$ and $\delta_b=\Omega_{\tau_b}$, respectively. $L_c^{max}$ and $L_c^{min}$ are then found from the intersection of these deviated lines with $\tilde{F}_{ice}^{cr}$. The error is set in $L_c$ as $\Omega_{L_c}=\frac{1}{2}(L_c^{max}+L_c^{min})$.

Performance Data

In Table 1, the various interfacial properties are measured between ice and 23 different surfaces. SO: silicone oil. PM: PVC plasticized with 50 wt. % MCT, drop-cast at differing solution concentrations to control the final film thickness.

TABLE 1

| Surface | $S_q$ (µm) | $\theta_{rec}/\theta_{adv}$ | $\tau_{ice}$ (kPa) | $L_c$ (cm) | $F_{ice}^{cr}$ (N/cm) | $\Gamma_{ice}$ (J/m²) |
| --- | --- | --- | --- | --- | --- | --- |
| Mold Max STROKE | 0.71 ± 0.11 | 113°/96° | 28 ± 3 | ≥20 | ≥55 | ≥0.29 |
| ↑ +40 wt % SO | 0.59 ± 0.24 | 115°/86° | 5.3 ± 0.3 | ≥20 | ≥16 | ≥0.02 |
| ↑ (t ≈ 1 µm) | 0.56 ± 0.11 | 113°/96° | 54 ± 20 | 6.7 ± 3.2 | 35 ± 4 | 0.12 ± 0.03 |
| Sylgard 184 | 0.26 ± 0.10 | 120°/87° | 117 ± 23 | x | ≥175 | ≥2.44 |
| ↑ +25 wt % SO | 0.19 ± 0.15 | 112°/102° | 55 ± 11 | ≥20 | ≥128 | ≥1.60 |
| UHMWPE | 3.3 ± 0.3 | 103°/76° | 221 ± 38 | 3.1 ± 0.8 | 70 ± 8 | 0.48 ± 0.11 |
| ABS | 0.33 ± 0.03 | 99°/59° | 320 ± 56 | 2.5 ± 0.6 | 75 ± 5 | 0.54 ± 0.07 |
| PTFE | 2.4 ± 0.1 | 123° ± 91° | 241 ± 36 | 3.5 ± 0.7 | 77 ± 8 | 0.59 ± 0.12 |
| CPVC | 1.2 ± 0.2 | 89°/72° | 147 ± 11 | 5.6 ± 0.5 | 85 ± 6 | 0.70 ± 0.10 |
| LDPE | 0.73 | 108°/83° | 238 ± 27 | 4.6 ± 0.6 | 105 ± 12 | 1.08 ± 0.24 |
| PP | 0.29 ± 0.13 | 104°/86° | 322 ± 42 | 3.6 ± 0.7 | 113 ± 12 | 1.25 ± 0.27 |
| PS | 4.2 ± 0.1 | 103°/64° | 151 ± 20 | 8.1 ± 1.4 | 120 ± 17 | 1.41 ± 0.40 |
| Garolite | 0.8 ± 0.1 | 85°/35° | 317 ± 58 | 4.9 ± 1.0 | 137 ± 20 | 1.84 ± 0.53 |
| PETG | 0.15 ± 0.03 | 89°/62° | 251 ± 49 | 6.8 ± 1.8 | 169 ± 40 | 2.80 ± 1.33 |
| PMMA | 0.16 ± 0.04 | 78°/52° | 280 ± 45 | 6.2 ± 1.2 | 170 ± 22 | 2.83 ± 0.72 |
| Nylon | 0.35 ± 0.24 | 53°/15° | 373 ± 99 | 4.8 ± 1.7 | 179 ± 22 | 3.13 ± 0.76 |
| PC | 0.10 ± 0.04 | 92°/69° | 302 ± 20 | 6.5 ± 0.7 | 207 ± 22 | 4.19 ± 0.90 |
| PVC | 0.13 | 92°/63° | 248 ± 52 | 9.3 ± 2.2 | 229 ± 52 | 5.12 ± 2.33 |
| PM (t = 139 µm) | 0.10 ± 0.02 | 92°/83° | 70 ± 4 | ≥20 | ≥150 | ≥2.21 |
| PM (t = 88 µm) | 0.27 ± 0.07 | 95°/75° | 84 ± 10 | 13.9 ± 1.9 | 103 ± 11 | 1.05 ± 0.21 |

TABLE 1-continued

| Surface | $S_q$ (µm) | $\theta_{rec}/\theta_{adv}$ | $\tau_{ice}$ (kPa) | $L_c$ (cm) | $\tilde{F}_{ice}^{cr}$ (N/cm) | $\Gamma_{ice}$ (J/m²) |
|---|---|---|---|---|---|---|
| PM (t = 48 µm) | 0.15 ± 0.02 | 93°/82° | 67 ± 7 | 14.0 ± 1.7 | 87 ± 12 | 0.74 ± 0.20 |
| PM (t = 19 µm) | 0.40 ± 0.19 | 93°/81° | 99 ± 21 | 7.1 ± 1.8 | 72 ± 11 | 0.51 ± 0.16 |
| PM (t = 1.5 µm) | 1.5 ± 0.3 | 97°/77° | 128 ± 75 | 3.3 ± 3.9 | 44 ± 5 | 0.20 ± 0.05 |

First, it is verified that a force required to remove lengths of ice $L > L_c$ reaches an asymptotic value by dislodging ice adhered to thirteen different engineering plastics. A setup similar to those reported previously is used, but instead of using relatively small interfacial areas (a few square millimeters of ice), the apparatus is designed so that much larger ice interfaces could be evaluated (inset FIG. 1D). For each material, the force necessary to detach the ice per unit width (inset, FIG. 1C), $\tilde{F}_{ice}$, increases proportionally with length for small adhesive lengths. Beyond $L_c$, no additional force is necessary to dislodge the ice (FIG. 1B). This asymptotic force, $\tilde{F}_{ice}^{cr}$, may be used to find interfacial toughness with ice ($\Gamma_{ice}$) as $\Gamma_{ice} = (\tilde{F}_{ice}^{cr})^2/2E_{ice}h$. Several icephobic surfaces are similarly evaluated, such as polydimethylsiloxane (PDMS) rubbers, which have been thoroughly studied previously for their low ice adhesion properties (FIG. 1A). The ice adhesion strength of four different silicone rubbers, varying in modulus and content of un-crosslinked, trimethyl-terminated PDMS chains (silicone oil). Although $\tau_{ice}$ ranges from $\tau_{ice}$=5.3 kPa, for the softest rubber, to $\tau_{ice}$=117 kPa, for the stiffest rubber, the adhesive fracture between ice and all four silicone surfaces is controlled by adhesive strength (FIG. 1A, also Table 1).

An asymptotic force of detachment is not observed for these materials over the same lengths measured, highlighting that failure by crack propagation is unique from the mechanisms enabling low ice adhesion, namely lubrication, interfacial cavitation, and low surface energy.

For an interfacial length of 100 cm, it is observed that the force required to remove ice adhered to an icephobic PDMS rubber ($\tau_{ice}$=29±2 kPa) still scales with the interfacial area, i.e. $\tilde{F}_{ice}$=297±48 N/cm (FIG. 1C). For a plastic like polypropylene, which is not icephobic ($\tau_{ice}$=322±42 kPa), crack propagation becomes the dominant failure mode after $L_c$=3.6 cm, and the force to remove adhered ice is the same at L=100 cm as it is at L=4 cm: $\tilde{F}_{ice}^{cr}$=113±12 N/cm. Therefore, the apparent ice adhesion strength $\tau^*_{ice}=\tilde{F}_{ice}/L$, is about half that of the icephobic silicone/PDMS, although the true ice adhesion strength ($\tau_{ice}$) is an order of magnitude greater (FIG. 1D). Achieving $\tau_{ice}$<15 kPa in the past typically necessitated using either soft rubbers, or highly lubricated systems, where durability issues can be a problem. However, achieving an apparent ice adhesion strength $\tau^*_{ice}$ less than or equal to about 15 kPa is tenable by utilizing crack propagation, especially for the interfacial lengths relevant to most engineering structures (length (L) greater than or equal to 1 m). Based on these results, anti-icing surfaces of the present disclosure are defined by apparent ice adhesion strength $\tau^*_{ice}$ and not actual ice adhesion strength $\tau_{ice}$.

Low interfacial toughness (LIT) materials are designed in order to minimize $\tilde{F}_{ice}^{cr}$ in accordance with certain aspects of the present teachings. For purely Van der Waals interactions, the minimum possible interfacial toughness $\Gamma_{ice}$ is approximately 0.1 J/m². The toughness of an interface may be approximated by the area under the force-displacement curve during interfacial separation. Assuming linear elastic fracture mechanics, $\Gamma_{ice} \approx \tau_{ice}^2 t/2G$, where G is the shear modulus and t is the thickness of the material. PVC is solution processed in order to vary the thickness and confirm that $\Gamma_{ice}$ scales directly with the thickness of the coating (FIG. 2A). By lowering a coating thickness from 1.6 mm to 2 µm (Table 1), the effective toughness of the interface is reduced from 5.12 J/m² to 1.78 J/m².

To further reduce $\Gamma_{ice}$, both $\tau_{ice}$ and G are altered by adding a plasticizing agent (fractionated coconut oil—MCT) into PVC. Lowering G may cause the interface to buckle, blunting the crack tip and increasing the strength-controlled regime of fracture (FIG. 2B). When the coating thickness is small enough to avoid this buckling instability (FIGS. 2B-2C), the addition of plasticizer always lowers the toughness of the interface (FIG. 2D). By optimizing the thickness and plasticizing agent content within the PVC, LIT materials are fabricated exhibiting $\Gamma_{ice}$ as low as 0.2 J/m² ($\tilde{F}_{ice}^{cr}$=46±5 N/cm). Similarly, by lowering $\tau_{ice}$ and G with plasticizers, an LIT PDMS (40 wt. % silicone oil, Table 1) is fabricated that displays an even lower $\Gamma_{ice}$≈0.12 J/m²($\tilde{F}_{ice}^{cr}$=35±4 N/cm).

Large-scale tests are conducted on these LIT PVC and LIT PDMS surfaces inside a −20° C. walk-in freezer. 1.2 meter-long aluminum beams are coated with plasticized PVC (50 wt. % MCT) and PDMS (40 wt. % silicone oil), both with a nominal thickness of t≈1-2 µm. Because toughness controls the fracture of ice from these two systems, the force of detachment does not increase beyond the critical length $L_c$, even over one meter of interfacial length ($\tilde{F}_{ice}^{cr}$=46±5 N/cm for the LIT PVC and $\tilde{F}_{ice}^{cr}$=35±4 N/cm for the LIT PDMS surfaces, Figure 3A). This results in $\tau^*_{ice}$=7 kPa and $\tau^*_{ice}$=5 kPa, for the plasticized PVC and PDMS surfaces, respectively. In contrast, for an extremely soft, icephobic PDMS rubber (plasticized Silicone B, $\tau_{ice}$=6 kPa), at L=100 cm, $\tilde{F}_{ice}$=84±23 N/cm. One meter is merely representative and de minimus compared to the length of power-lines, turbine blades, airplane wings, or boat hulls, and thus the advantage of LIT materials according to certain aspects of the present disclosure becomes even more stark with increasing length.

Whether an icephobic material (low $\tau_{ice}$), or a LIT material (low $\Gamma_{ice}$) will require less force to detach adhered ice depends on the interfacial length. There is a minimum length beyond which LIT materials require less force than icephobic materials to remove adhered ice (FIG. 3B). For example, consider two commonly iced surfaces: car windshields and wind turbine blades. The application lengths of these two surfaces are around 1 m and 80 m, respectively. For a sheet of ice 1 cm thick adhered to a car windshield, icephobic surfaces will outperform LIT materials only if $\tau_{ice}$<4.12 kPa ($\tilde{F}_{ice}=\tau_{ice}L$=41.2 N/cm). Although challenging to develop, such extremely low values of $\tau_{ice}$ have been reported. However, for the same thickness of ice adhered to a wind turbine blade, the necessary icephobicity needed to outperform LIT materials is $\tau_{ice}$<0.052 kPa. Without external energy input, even highly lubricated systems have not reached this ultra-low $\tau_{ice}$ value. In contrast, several of the inventive systems having low interfacial toughness with ice (LIT) exhibit $\tilde{F}_{ice}^{cr}$<41.2 N/cm (Table 1).

Because the ice adhesion community has focused solely on reducing $\tau_{ice}$ for the last 70 years, typically only shear-based evaluations of ice adhesion have been employed. However, LIT materials in accordance with certain aspects of the present disclosure are effective for Mode-I (normal) and Mode-II (shear) methods of ice removal. For example, four-point loaded beam tests are conducted by flexing 1.2 meter-long uncoated, icephobic-coated, and LIT-material coated Al beams, with ice adhered to one side. The icephobic and LIT coatings are fabricated using the exact same polymer, PDMS, but the icephobic system exhibits low interfacial strength ($\tau_{ice}$=30 kPa), whereas the LIT PDMS exhibits low interfacial toughness ($\Gamma_{ice}$=0.12 J/m$^2$). Upon flexing, ice fractures cleanly from the LIT coating with an extremely low deflection of 2.4 cm from the center of the beam (FIG. 4A). Both the uncoated and icephobic-coated Al beams display no significant signs of ice detachment even at an extreme deflection of approximately 35 cm. Even after repeated deflection cycles the ice remains adhered to the uncoated and icephobic beams. To mimic deicing an airplane via wing tip deflection, cantilever beam tests are conducted with one end of the iced beam clamped and the other end subjected to load (FIG. 4B). The deflection necessary to remove the ice adhered to the LIT material is an order of magnitude less than that of the icephobic or uncoated surfaces. These results are significant for applications where simple flexure could be employed as a de-icing method, such as aircraft wings, power line cables, or wind turbine blades.

Ice-adhesion strength, $\tau_{ice}$, typically only characterizes an ice interface at small length scales. At larger length scales, the interfacial toughness determines the force necessary to fracture an iced interface. Materials that exhibit low interfacial toughness with ice can display ultra-low apparent-ice-adhesion strengths when the application length is greater than the critical crack length, $L_c$. LIT materials may be designed by using thin, plasticized polymers. Because the characteristic length scale of most engineering applications plagued by ice accumulation is typically tens to hundreds of meters (for example, wind turbine blades, boat hulls, airplane wings, power lines, etc.), the present teachings provide coatings for curtailing the ice-accretion problem for large-scale engineering applications.

Thirteen different, common engineering plastics are tested (FIGS. 5A-5D, 6A-6D, 7A-7D, 8A-8D, 9A-9D, and 10A-10D). For each surface, a moderately high ice adhesion strength is observed (given by the slope of the $\tilde{F}_{ice}$ vs L data for L<$L_c$), which ranges from $\tau_{ice}$=147 kPa, for chlorinated polyvinylchloride (CPVC), to $\tau_{ice}$=373 kPa, for nylon.

However, dissimilar to the icephobic, silicone rubbers, each plastic also exhibits a toughness-controlled regime of fracture, which began at $L_c$=3.5 cm, for polytetrafluoroethylene (PTFE), to $L_c$=10 cm for acrylonitrile butadiene styrene (ABS). Accordingly, an asymptotic force of detachment ($\tilde{F}_{ice}^{cr}$) is observed for each plastic, corresponding to an interfacial toughness given by Eq. (7) (Table 1). $L_c$ may be found when the force of fracture for the strength and toughness regimes are equated as, $$L_c = 1.4\sqrt{\frac{E\Gamma_{ice}h}{\tau_{ice}^2}} \quad (4)$$

Note that decreasing $\tau_{ice}$ in Eq. (4) increases $L_c$, and thus extremely long interfacial lengths are necessary to observe toughness-controlled fracture between ice and icephobic surfaces.

These results highlight an important development with respect to ice adhesion. The efficacy of an anti-icing surface should be determined by $\tau^*_{ice}$ and not $\tau_{ice}$. For interfacial lengths less than ξ, the proper materials to use are icephobic surfaces that exhibit extremely low $\tau^*_{ice}$=$\tau_{ice}$. These materials fracture by adhesive strength, leading to low forces of detachment per adhesive area. However, for adhesive lengths greater than ξ, i.e. large structures, LIT materials that exhibit low $\tau^*_{ice}$ should be used, assuming actual length is greater than the critical length (L»$L_c$). LIT materials prepared in accordance with certain aspects of the present disclosure also have the distinct advantage of being fabricated from common, durable, engineering polymers. Achieving $\tau_{ice}$<15 kPa has proven difficult in the past without using either soft rubbers, or highly lubricated systems, where durability issues have been previously reported. Achieving $\tau^*_{ice}$<15 kPa is relatively easy with LIT materials, assuming a long adhesive length. For example, the ice adhesion setup is placed in a −20° C. walk-in freezer, and evaluated a meter-long interfacial area of ice adhered to ultra-high molecular weight polyethylene (UHMWPE). $\tilde{F}_{ice}^{cr}$=127 N/cm or $\tau^*_{ice}$=12.7 kPa is observed, although τice=221±38 kPa.

Previously it has been shown that $\tau_{ice}\propto 1+\cos\theta_{rec}$, where $\theta_{rec}$ is the angle at which water recedes from the surface. While this trend is observed for the thirteen different plastics evaluated (FIG. 11A), no apparent trend is found with $\Gamma_{ice}$ and the $1+\cos\theta_{rec}$ parameter (FIG. 11B). Whereas the ice adhesion strength correlate to the work of adhesion (Wa=γLV(1+cos$\theta_{rec}$), where γLV is the surface tension of water), it did not correlate with the interfacial toughness between a material and ice. Therefore, LIT materials need not be fabricated from low surface energy components. For example, chlorinated polyvinylchloride (CPVC) displayed a moderately low $\Gamma_{ice}$ value and is hydrophilic (Table 1).

For an interface bonded by purely van der Waals interactions, the interfacial toughness is minimized at a value of $\Gamma_{ice}\approx 0.1$ J/m$^2$. The ultimate anti-icing material would exhibit ultra-low $\tau_{ice}$, and an interfacial toughness approaching this theoretical minimum. To achieve such a system, the effects of plasticizing agents on both $\tau_{ice}$ and $\Gamma_{ice}$ is first investigated. PVC may be solution processed and is known to uptake large quantities of plasticizers. PVC could be plasticized with fractionated coconut oil (MCT), and it is observed a decreasing $\xi_{ice}$ value with increasing plasticizer content (FIG. 2C). A blend of equal parts PVC and MCT exhibited $\tau_{ice}$=70±4 kPa, for a coating with thickness t=140 μm. However, the interfacial fracture between ice and the plasticized PVC scaled with interfacial length; strength controlled 16 the adhesive fracture (FIG. 2B). At an adhesive length of L=20 cm, $\tilde{F}_{ice}$=150 N/cm is observed.

The interface between the ice and the plasticized PVC buckled during fracture, indicating that normal (mode-I) stresses are responsible for the fracture as, $$\tau_{ice}\propto\sqrt{W_a G/t} \quad (6)$$

where G is the shear modulus of the plasticized PVC, of thickness t. Whereas the thickness of the layer controls the amplitude of the buckling instability, and thereby $\tau_{ice}$, this can only occur at a shear strain less than γ=$\tau_{ice}$/G. Accordingly, by lowering the thickness (Table 1), $\Gamma_{ice}$ is modified in the following way. $\Gamma_{ice}$ represents the energy required to de-bond an interfacial area and may be approximated from the area under the force displacement curve. Assuming linear elasticity, the force is given by $A\tau_{ice}$, where A is the interfacial area, and the displacement, d, can be found as $d=\gamma t=t\tau_{ice}/G$, where $\gamma$ is the critical shear strain the interface experiences at $\tau_{ice}$. The interfacial toughness may then be approximated as, $$\Gamma_{ice} \cup \tau_{ice}^2 t/2G \qquad (7)$$

Therefore, if the displacement is limited by a critical shear strain on the interface, the interfacial toughness will scale with the thickness of the adhesive layer (FIG. 2A). For example, whereas the interfacial fracture is controlled by adhesive strength up to L=75 cm for a thick, plasticized PVC sample (t≈275 μm, $\Gamma_{ice}$=17 J/m²), lower interfacial toughness is observed for thinner samples (FIG. 2B). Note that Eq. (7) is only valid for interfaces limited by a critical shear strain, and therefore decreasing coating thickness will not typically decrease $\Gamma_{ice}$.

The effects of thickness and the plasticizer content on $\Gamma_{ice}$ are further explored herein. For thick PVC samples, a large $\Gamma_{ice}$ is observed regardless of plasticizer content. However, the thinnest samples (t≈1-2 μm) displayed very low $\Gamma_{ice}$, even with only 5 wt. % added plasticizer (FIG. 2C). At 10 wt. % plasticizer, $\Gamma_{ice}$≈0.4 J/m², and at 50 wt. % plasticizer, PVC displayed $\Gamma_{ice}$≈0.2 J/m², approaching the theoretical lower limit for interfacial toughness. For all thicknesses, an exponential decrease in $\Gamma_{ice}$ is observed for increasing plasticizer content (FIG. 2D). However, note that the addition of a plasticizer affects both G and $\tau_{ice}$ in Eq. (5), and therefore the effect of the plasticizer on $\Gamma_{ice}$ is not straightforward. Even so, at a thickness of t≈1.5 μm, unplasticized PVC displayed $\Gamma_{ice}$=1.9 J/m², indicating that the addition of the plasticizer did have a significant effect on reducing $\Gamma_{ice}$.

To confirm these findings, two additional, large-scale tests are conducted. 1.2 meter-long samples are coated with either the plasticized PVC (50 wt. % MCT), or an icephobic PDMS ($\tau_{ice}$≈50 kPa, Table 1), both with nominal thickness of t approximately equal to about 1-2 μm. If toughness truly controls the fracture of ice from such systems, the necessary force of detachment would not increase beyond $L_c$, even over a meter of interfacial length. This is exactly observed, resulting in $\tau^*_{ice}$=7 kPa and $\tau^*_{ice}$=5 kPa, for the plasticized PVC and PDMS surfaces, respectively (FIG. 3A). In fact, some of our individual $\widetilde{F_{ice}}$ measurements at L=100 cm are lower than values measured for L=2 cm, for the plasticized PVC surface (i.e. on occasion, a greater force is required to detach ice from an interfacial area 50× shorter). This unambiguously confirmed that the fracture of ice from LIT materials is indeed independent of adhesive area, when the fracture is controlled by interfacial toughness.

LIT materials are particularly suitable for certain applications. Assuming a minimum interfacial toughness of $\Gamma_{ice}$=0.1 J/m², a length exists (for a given thickness of ice) for which LIT materials will require less force to fracture adhered ice (FIG. 3B). For example, consider two commonly iced surfaces: car windshields and wind turbine blades. The application lengths of these two surfaces are around 1 m and 80 m, respectively. For a sheet of ice h=1 cm thick adhered to a car windshield, icephobic surfaces will outperform LIT materials only if $\tau_{ice}$<4.12 kPa ($\widetilde{F_{ice}}=\tau_{ice}L$=4,120 N/m). Although challenging to develop, such extremely low values of $\tau_{ice}$ have been reported. For example consider thick, icephobic silicone rubber, for which $\tau_{ice}$=12.5 kPa. At L=1 m, strength-controlled fracture and $\widetilde{F_{ice}}$≈12,500 N/m is observed. The LIT PVC system prepared according to certain aspects of the present disclosure requires less force ($\widetilde{F_{ice}^{cr}}$≈4,400 N/m), although the ice adhesion strength is 24 times higher. Moreover, for the same thickness of ice adhered to a wind turbine blade, the necessary icephobicity needed to outperform LIT materials is $\tau_{ice}$<0.052 kPa ($\widetilde{F_{ice}}$=4,160 N/m). Without external energy input, even highly lubricated systems have not reached this ultra-low $\tau_{ice}$ value. In contrast, several of the systems discussed herein meet these criteria (Table 1).

The utility of LIT materials can also be shown using relatively small interfacial lengths, such as the inside of an ice cube tray. Two commercially available PP ice cube trays and coated one of them with an LIT PDMS prepared in accordance with certain aspects of the present disclosure (FIG. 12). Water is frozen in the trays at −20° C. overnight. The next day the trays are flipped upside down. All the ice cubes remain adhered in the uncoated tray, even with the application of a small applied torque. In contrast, 11 of the 16 ice cubes simply fell out of the coated tray upon flipping it over, and the remaining ones are removed with a very small applied torque. It can be expected that the much larger forces experienced during other applications, such as the flexing of an airplane wing during flight, the turbulent fluctuations bombarding a boat hull, or the bending of a power line or turbine blade in the wind, will also be sufficient to completely remove ice adhered to a LIT material.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An anti-icing coating having low interfacial toughness with ice comprising:
   a polymer; and
   a plasticizing agent, wherein a shear force to remove ice from the anti-icing coating remains substantially constant when a length of the anti-icing coating is greater than a critical length ($L_c$) of the anti-icing coating and the anti-icing coating has an interfacial toughness ($\Gamma_{ice}$) with ice of less than or equal to about 1 J/m².

2. The anti-icing coating of claim 1, wherein the anti-icing coating has an interfacial toughness ($\Gamma_{ice}$) with ice of less than or equal to about 0.25 J/m².

3. The anti-icing coating of claim 1, wherein the anti-icing coating has a surface area of greater than or equal to about 3 cm².

4. The anti-icing coating of claim 1, wherein the anti-icing coating has a surface area of greater than or equal to about 1 m².

5. The anti-icing coating of claim 1, wherein the anti-icing coating has a critical length ($L_c$) of greater than or equal to about 2.5 cm.

6. The anti-icing coating of claim 1, wherein the polymer is selected from the group consisting of: polyvinyl chloride (PVC), polydimethylsiloxane (PDMS), polyethylene (PE), ultra-high molecular weight polyethylene (UHMWPE), low density polyethylene (LDPE), polypropylene (PP), polycarbonate (PC), polystyrene (PS), polymethylmethacrylate (PMMA), glycol-modified polyethylene terephthalate (PETG), polyamide (nylon), acrylonitrile butadiene styrene (ABS), polyvinylchloride (PVC), chlorinated polyvinylchloride (CPVC), polytetrafluoroethylene (PTFE), a fiberglass-epoxy laminate, and combinations thereof.

7. The anti-icing coating of claim 1, wherein the plasticizing agent is selected from the group consisting of: polydimethylsiloxane (PDMS) oil, polymethylphenylsiloxane (PMPS) oil, polymethylhydrosiloxane (PMHS), polyalkylene oils, perfluoroether oils, natural oils, coconut oil, soybean oil, vegetable oil, cod liver oil, safflower oil, eucalyptus oil, fish oils, rapeseed oil, fluorinated silicone oils, perfluorodecalin, fluorocarbon oils, perfluoropolyether oil (PFPE), castor oil, mineral oils, functionalized silicone oils, functionalized perfluoropolyethers, diisodecyl adipate (DIDA), medium-chain triglyceride (MCT), diundecyl phthalate (DUP), and combinations thereof.

8. The anti-icing coating of claim 1, wherein the polymer is present at greater than or equal to about 10% to less than or equal to about 99% by mass of the anti-icing coating.

9. The anti-icing coating of claim 1, wherein the plasticizing agent is present at greater than or equal to about 1% to less than or equal to about 60% by mass in the anti-icing coating.

10. The anti-icing coating of claim 1, wherein the thickness of the anti-icing coating is greater than or equal to about 10 nanometers (nm) to less than or to about 100 micrometers (μm).

11. A device comprising:
a surface; and
an anti-icing coating comprising a polymer and a plasticizing agent disposed on the surface, wherein a shear force to remove ice from the anti-icing coating remains substantially constant when a length of the anti-icing coating is greater than a critical length ($L_c$) of the anti-icing coating and the anti-icing coating has an interfacial toughness with ice of less than or equal to about 1 J/m².

12. The device of claim 11, wherein the device is selected from the group consisting of: an aircraft, a vehicle, a marine vessel, outdoor equipment, snow or ice removal equipment, recreational equipment, a wind turbine, telecommunications equipment, power lines, and combinations thereof.

13. The device of claim 11, wherein the anti-icing coating has an interfacial toughness ($\Gamma_{ice}$) with ice of less than or equal to about 0.5 J/m².

14. The device of claim 11, wherein the anti-icing coating covers a surface area of greater than or equal to about 3 cm² on the surface of the device.

15. The device of claim 11, wherein the anti-icing coating covers a surface area of greater than or equal to about 1 m² on the surface of the device.

16. The device of claim 11, wherein the anti-icing coating has a critical length ($L_c$) of greater than or equal to about 2.5 cm and the anti-icing coating covers a length of the surface of greater than the critical length.

17. The device of claim 11, wherein the polymer is selected from the group consisting of: polyvinyl chloride (PVC), polydimethylsiloxane (PDMS), polyethylene (PE), ultra-high molecular weight polyethylene (UHMWPE), low density polyethylene (LDPE), polypropylene (PP), polycarbonate (PC), polystyrene (PS), polymethylmethacrylate (PMMA), glycol-modified polyethylene terephthalate (PETG), polyamide (nylon), acrylonitrile butadiene styrene (ABS), polyvinylchloride (PVC), chlorinated polyvinylchloride (CPVC), polytetrafluoroethylene (PTFE), a fiberglass-epoxy laminate, and combinations thereof.

18. The device of claim 11, wherein the plasticizing agent is selected from the group consisting of: polydimethylsiloxane (PDMS) oil, polymethylphenylsiloxane (PMPS) oil, polymethylhydrosiloxane (PMHS), polyalkylene oils, perfluoroether oils, natural oils, coconut oil, soybean oil, vegetable oil, cod liver oil, safflower oil, eucalyptus oil, fish oils, rapeseed oil, fluorinated silicone oils, perfluorodecalin, fluorocarbon oils, perfluoropolyether oil (PFPE), castor oil, mineral oils, functionalized silicone oils, functionalized perfluoropolyethers, diisodecyl adipate (DIDA), medium-chain triglyceride (MCT), diundecyl phthalate (DUP), and combinations thereof.

19. The device of claim 11, wherein the polymer is present at greater than or equal to about 10% to less than or equal to about 99% by mass of the anti-icing coating and the plasticizing agent is present at greater than or equal to about 1% to less than or equal to about 60% by mass in the anti-icing coating.

20. The device of claim 11, wherein the thickness of the anti-icing coating is greater than or equal to about 10 nanometers (nm) to less than or to about 100 micrometers (μm).

21. A method of forming an anti-icing surface on a substrate comprising:
applying an anti-icing coating to a surface of the substrate, wherein the anti-icing coating comprises a polymer, wherein a shear force to remove ice from the anti-icing coating remains substantially constant when a length of the anti-icing coating is greater than a critical length ($L_c$) of the anti-icing coating and the anti-icing coating disposed on the surface has an interfacial toughness with ice of less than or equal to about 1 J/m².

22. The method of claim 21, wherein the anti-icing coating covers the surface of the substrate having a surface area of greater than or equal to about 3 cm², and wherein the substrate is part of a device selected from the group consisting of: an aircraft, a vehicle, a marine vessel, outdoor equipment, snow or ice removal equipment, recreational equipment, a wind turbine, telecommunications equipment, power lines, and combinations thereof.

23. An anti-icing coating having low interfacial toughness with ice comprising:
a polymer; an
a plasticizing agent, wherein the anti-icing coating has an interfacial toughness ($\Gamma_{ice}$) with ice of less than or equal to about 1 J/m² and a critical length ($L_c$) of greater than or equal to about 2.5 cm.

\* \* \* \* \*

UNITED STATES PATENT AND TRADEMARK OFFICE
CERTIFICATE OF CORRECTION

| | |
|---|---|
| PATENT NO. | : 11,965,112 B2 |
| APPLICATION NO. | : 16/977797 |
| DATED | : April 23, 2024 |
| INVENTOR(S) | : Anish Tuteja et al. |

It is certified that error appears in the above-identified patent and that said Letters Patent is hereby corrected as shown below:

In the Claims

At Column 26, Claim number 23, Line number 54, delete "an" and insert --and--.

Signed and Sealed this
Twelfth Day of November, 2024

*Katherine Kelly Vidal*

Katherine Kelly Vidal
*Director of the United States Patent and Trademark Office*